United States Patent
Wang et al.

(10) Patent No.: US 9,923,687 B2
(45) Date of Patent: Mar. 20, 2018

(54) METHOD AND APPARATUS FOR MEASURING COMMUNICATION QUALITY

(71) Applicant: Huawei Technologies Co., Ltd., Shenzhen, Guangdong (CN)

(72) Inventors: Jianguo Wang, Bonn (DE); Jianghua Liu, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 14/973,975

(22) Filed: Dec. 18, 2015

(65) Prior Publication Data
US 2016/0105265 A1    Apr. 14, 2016

Related U.S. Application Data

(63) Continuation of application No. PCT/CN2013/077477, filed on Jun. 19, 2013.

(51) Int. Cl.
*H04L 5/00* (2006.01)
*H04B 17/309* (2015.01)
*H04L 1/00* (2006.01)

(52) U.S. Cl.
CPC ......... *H04L 5/0048* (2013.01); *H04B 17/309* (2015.01); *H04L 1/0026* (2013.01); *H04L 5/0023* (2013.01)

(58) Field of Classification Search
CPC ... H04L 5/0048; H04L 5/0023; H04L 1/0026; H04L 5/0001; H04W 72/042;
(Continued)

(56) References Cited

U.S. PATENT DOCUMENTS

2012/0176939 A1  7/2012  Qu et al.
2014/0133336 A1*  5/2014  Park ............... H04W 24/10
                                                    370/252
(Continued)

FOREIGN PATENT DOCUMENTS

CN  102255689 A  11/2011
CN  102378114 A   3/2012
(Continued)

OTHER PUBLICATIONS

"Considerations on CSI feedback enhancements for high-priority antenna configurations", Alcatel-Lucent Shanghai Bell, Alcatel-Lucent, 3GPP TSG-RAN WG1 #66, Aug. 22-26, 2011, 7 pages, R1-112420.
(Continued)

*Primary Examiner* — Paul H Masur
*Assistant Examiner* — Michael Phillips

(57) ABSTRACT

A method and an apparatus for measuring communication quality are disclosed. The method includes: acquiring reference signal resource configuration information, where the reference signal resource configuration information at least includes: reference signal port configuration information, and reference signal power information of at least one port group; or the reference signal resource configuration information at least includes: reference signal port configuration information, and a ratio of a power of a data channel in at least one port group to a power of a reference signal; and sending the acquired reference signal resource configuration information to user equipment. Therefore, in a multi-antenna system, accurate signal quality measurement information is acquired, or more accurate channel state information is acquired.

8 Claims, 8 Drawing Sheets

(58) Field of Classification Search
CPC . H04W 24/10; H04W 52/146; H04W 52/242; H04W 52/143; H04W 52/325; H04B 17/309
See application file for complete search history.

(56) References Cited

U.S. PATENT DOCUMENTS

| | | |
|---|---|---|
| 2014/0162717 A1 | 6/2014 | Liu |
| 2014/0177584 A1* | 6/2014 | Ouchi ................ H04W 52/146 370/329 |
| 2014/0329553 A1* | 11/2014 | Nakashima ......... H04W 52/365 455/522 |
| 2015/0071238 A1 | 3/2015 | Seo et al. |
| 2016/0006549 A1* | 1/2016 | Kim ..................... H04L 1/0026 370/252 |

FOREIGN PATENT DOCUMENTS

| | | |
|---|---|---|
| CN | 102687438 A | 9/2012 |
| CN | 102958147 A | 3/2013 |
| WO | WO 2013/081368 A1 | 6/2013 |

OTHER PUBLICATIONS

"Discussion on 3D antenna model", Huawei, HiSilicon, 3GPP TSG RAN WG1 Meeting #72bis, Apr. 15-19, 2013, 6 pages, R1-130897.

* cited by examiner

METHOD AND APPARATUS FOR MEASURING COMMUNICATION QUALITY

CROSS-REFERENCE TO RELATED APPLICATIONS

This application is a continuation of International Application No. PCT/CN2013/077477, filed on Jun. 19, 2013, which is hereby incorporated by reference in its entirety.

TECHNICAL FIELD

The present invention relates to the field of communications technologies, and in particular, to a method and an apparatus for measuring communication quality.

BACKGROUND

In the field of communications technologies, signals may usually be classified into two types: one type of signal carries information from a higher layer; the other type of signal does not carry information from a higher layer, and this type of signal is usually used for assisting in or indicating reception of the former type of signal. A transmit power of a signal is a very important parameter for both types of signals above. For example, a power of a reference signal may be used for deriving a path loss estimation value, and the path loss estimation value may be used as a part of open-loop control to implement uplink power control, or may be used as a basis for selecting a cell (or a transmit node, or a receive node). A power ratio of a physical downlink shared channel (PDSCH) signal to a reference signal (for example, a cell-specific reference signal (CRS) or a channel state information reference signal (CSI-RS)) may be used for deriving channel state information (CSI), thereby facilitating implementation of scheduling and link adaptation.

In existing Long Term Evolution (LTE) Releases R8-R11, a power-related parameter is determined on a base station side or a network side, and is notified to user equipment (UE) by using higher layer signaling. Because a conventional base station antenna configuration has a fixed downtilt, and an uplink and a downlink undergo similar path losses, so that a downlink path loss can be desirably used for estimating an uplink path loss. Therefore, distinguishing of antenna ports can be omitted in the power-related parameter sent by the base station side or the network side, and especially in a case of multiple antenna ports. If antenna ports are not distinguished, a downlink path loss can be desirably used for estimating an uplink path loss. The technology is desirably applicable to the conventional base station antenna configuration, especially if transmit powers of antenna ports are the same. In another aspect, a reference signal received power (RSRP), of a current cell/node or an adjacent cell/node, reported by user equipment (UE) may be used by a base station or an evolved node B (eNB) to select a serving cell or node for the UE. In the prior art, the RSRP is an estimation obtained by performing averaging on different antenna ports.

To lower a system cost and at the same time reach a higher system capacity and coverage requirement, active antenna systems (AAS) have been widely deployed in practice. At present, the LTE R12 standard that is about to be launched is considering enhancement of communication performance after introduction of an AAS system. Different from a conventional base station antenna, an AAS further provides design flexibility in a vertical direction of an antenna, where independent downtilts may be used in an uplink and a downlink, and powers of different antenna ports may be different. In addition, for AAS base stations, even if the AAS base stations have a same quantity of antenna ports, antenna array structures of the AAS base stations may also be different. Therefore, antenna ports having a same sequence number may also have different transmit powers in different array structures. In such a case, in the prior art, power control is implemented based on a downlink reference signal received power, or a method for selecting a cell/node is no longer effective. In the prior art, correct distinguishing cannot be performed if transmit powers of antenna ports are different, and a technical solution that accurately and effectively estimates an uplink path loss and estimates channel state information cannot be provided.

SUMMARY

Embodiments of the present invention provide a method and an apparatus for measuring communication quality, thereby overcoming a problem in the prior art that accurate signal quality measurement information cannot be acquired or more accurate channel state information cannot be acquired in a multi-antenna system.

A first aspect provides a method for measuring communication quality, including:

determining reference signal resource configuration information, where the reference signal resource configuration information includes reference signal port configuration information, where the reference signal port configuration information is used for indicating a mapping relationship between a reference signal port and a port group; and sending the reference signal resource configuration information to user equipment, so that the user equipment acquires signal quality measurement information according to the reference signal port configuration information.

In a first possible implementation manner, according to the first aspect, the reference signal resource configuration information further includes: reference signal power information of at least two port groups that is used by the user equipment to acquire the signal quality measurement information according to the reference signal port configuration information and in combination with the reference signal power information of the at least two port groups, and the reference signal power information of the at least two port groups includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

In a second possible implementation manner, with reference to the first aspect or the first possible implementation manner, the signal quality measurement information is a reference signal received power RSRP, and the method further includes:

sending, to the user equipment, filter coefficient information that is used by the user equipment to perform, based on the filter coefficient information, filtering on the reference signal received power RSRP and obtain a path loss estimation value.

In a third possible implementation manner, with reference to the second possible implementation manner, the method further includes:

receiving an uplink physical channel or an uplink physical signal sent by the user equipment, where a transmit power of the uplink physical channel or the uplink physical signal is obtained by means of calculation by the user equipment according to the path loss estimation value.

In a fourth possible implementation manner, with reference to the first aspect or the first possible implementation manner, the signal quality measurement information includes:

any one or any combination of a reference signal received power RSRP, a reference signal received quality RSRQ, and a reference signal strength indicator RSSI.

In a fifth possible implementation manner, with reference to the first aspect or any one of the first possible implementation manner to the fourth possible implementation manner, the method further includes:

receiving the signal quality measurement information sent by the user equipment.

A second aspect provides a method for measuring communication quality, including:

receiving reference signal resource configuration information sent by a base station, where the reference signal resource configuration information includes reference signal port configuration information, where the reference signal port configuration information is used for indicating a mapping relationship between a reference signal port and a port group;

obtaining reference signal port information in at least one port group according to the reference signal port configuration information; and acquiring signal quality measurement information according to the reference signal port information in the at least one port group.

In a first possible implementation manner, according to the second aspect, the obtaining reference signal port information in at least one port group according to the reference signal port configuration information includes:

obtaining reference signal port information in one specified port group according to the reference signal port configuration information; and the acquiring signal quality measurement information according to the reference signal port information in the at least one port group includes:

acquiring the signal quality measurement information according to the reference signal port information in the one specified port group.

In a second possible implementation manner, according to the first possible implementation manner of the second aspect, when the signal quality measurement information is a reference signal received power RSRP, the acquiring the signal quality measurement information according to the reference signal port information in the one specified port group includes:

obtaining a reference signal received power RSRP(r,p) of a pth port of an rth receive antenna according to a formula $$RSRP(r, p) = \frac{1}{K_s - 1} \sum_{m=0}^{K_s-1} \check{h}_p(m) \cdot \check{h}_p(m+1)$$

and obtaining the RSRP by combining RSRP(r,p), where $\check{h}_p(m)$ is a channel estimation on a reference signal RE whose label number is m, $K_s$ is a total sample quantity of usable reference signal REs in measurement bandwidth, p is a number of a reference signal port in the one specified port group, and r is an index of a receive antenna.

In a third possible implementation manner, with reference to the second aspect, the reference signal resource configuration information further includes: reference signal power information of at least two port groups that is used by the user equipment to acquire the signal quality measurement information according to the reference signal port configuration information and in combination with the reference signal power information of the at least two port groups.

In a fourth possible implementation manner, with reference to the third possible implementation manner of the second aspect, the acquiring the signal quality measurement information according to the reference signal port configuration information and in combination with the reference signal power information of the at least two port groups includes:

obtaining, according to the reference signal port configuration information, signal quality measurement information corresponding to the at least two port groups;

performing, according to the reference signal power information of the at least two port groups, weighted averaging on the obtained signal quality measurement information corresponding to the at least two port groups in accordance with a port group power, to obtain the signal quality measurement information.

In a fifth possible implementation manner, with reference to the fourth possible implementation manner of the second aspect, the performing, according to the reference signal power information of the at least two port groups, weighted averaging on the obtained signal quality measurement information corresponding to the at least two port groups in accordance with a port group power, to obtain the signal quality measurement information includes:

obtaining the signal quality measurement information according to a formula $$SQ = \left(\sum_{g=0}^{n-1} p_g \cdot SQ_g\right) \bigg/ \left(\sum_{g=0}^{n-1} p_g\right),$$

where $SQ_g$ is signal quality measurement information of a specified port group, g is a sequence number of a specified port group, n is a quantity of specified port groups, m≥2, and $p_g$ is a reference signal power of a specified port group, where the reference signal power of the specified port group is obtained according to the reference signal power information of the at least two port groups.

In a sixth possible implementation manner, with reference to any one of the second possible implementation manner to the fifth possible implementation manner of the second aspect, the reference signal power information of the at least two port groups includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

In a seventh possible implementation manner, with reference to any one of the second aspect to the sixth possible implementation manner, the method further includes:

sending the signal quality measurement information to the base station.

In an eighth possible implementation manner, with reference to any one of the second aspect to the seventh possible implementation manner, the signal quality measurement information is the reference signal received power RSRP, and the method further includes:

receiving filter coefficient information sent by the base station;

performing, based on the filter coefficient information, filtering on the reference signal received power RSRP, and obtaining a path loss estimation value.

In a ninth possible implementation manner, with reference to the eighth possible implementation manner of the second aspect, the method further includes:

sending an uplink physical channel or an uplink physical signal to the base station, where a transmit power of the uplink physical channel or the uplink physical signal is obtained by means of calculation according to the path loss estimation value.

In a tenth possible implementation manner, with reference to the second aspect, the signal quality measurement information includes: a reference signal received power RSRP, a reference signal strength indicator RSSI, or a reference signal received quality RSRQ.

A third aspect provides a method for measuring communication quality, including:

sending reference signal resource configuration information to user equipment, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal; and receiving channel state information CSI sent by the user equipment, where the CSI is obtained by the user equipment according to the reference signal port configuration information and the power ratio information.

In a first possible implementation manner, according to the third aspect, in the power ratio information:

power ratios of data channels on antenna ports in each port group among the at least one port group to a reference signal are the same; or power ratios of data channels on ports in one port group among the at least one port group and data channels on ports in another port group to a reference signal are the same.

In a second possible implementation manner, according to the third aspect or the first possible implementation manner of the third aspect, the power ratio information is used for indicating multiple sets of power ratios of data channels of the at least one port group to a reference signal; and the receiving channel state information CSI sent by the user equipment includes: receiving multiple sets of channel state information CSI that are sent by the user equipment, where each set of channel state information CSI is obtained by the user equipment according to one set of power ratios among the multiple sets of power ratios.

In a third possible implementation manner, with reference to the third aspect or the first possible implementation manner or the second possible implementation manner, the channel state information CSI includes: any one or any combination of a channel quality indicator CQI, a precoding matrix indicator PMI, and a rank indicator RI.

A fourth aspect provides a method for measuring communication quality. The method includes:

receiving reference signal resource configuration information sent by a base station, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal;

obtaining a power ratio of a data channel on each antenna port in the at least one port group to a reference signal according to the reference signal port configuration information and the power ratio information, and obtaining channel state information CSI according to the power ratio of the data channel on each antenna port to the reference signal; and sending the channel state information CSI to the base station.

In a first possible implementation manner, according to the fourth aspect, the obtaining channel state information CSI according to the power ratio of the data channel on each antenna port to the reference signal includes:

obtaining, according to the reference signal on each antenna port, a channel measurement value corresponding to each antenna port;

obtaining a channel estimation value of the data channel on each antenna port according to the channel measurement value corresponding to each antenna port and the power ratio of the data channel on each antenna port to the reference signal; and obtaining the channel state information CSI according to the channel estimation value of the data channel on each antenna port.

In a second possible implementation manner, with reference to the first possible implementation manner, the obtaining a channel estimation value of the data channel on each antenna port according to the channel measurement value corresponding to each antenna port and the power ratio of the data channel on each antenna port to the reference signal includes:

obtaining a channel estimation value of a data channel on an antenna port p according to a formula $\hat{h}_p = \sqrt{\rho_p} h_p$, where p is an index of the antenna port, $\rho_p$ is a power ratio of the data channel on the antenna port p to a reference signal, $h_p$ is a channel measurement value corresponding to the antenna port p, and $\hat{h}_p$ is a channel estimation value of the data channel on the antenna port p.

In a third possible implementation manner, with reference to the fourth aspect or the first possible implementation manner or the second possible implementation manner, in the power ratio information, power ratios of data channels on antenna ports in each port group among the at least one port group to a reference signal are the same; or power ratios of data channels on ports in one port group among the at least one port group and data channels on ports in another port group to a reference signal are the same.

In a fourth possible implementation manner, with reference to the fourth aspect, the power ratio information is used for indicating multiple sets of power ratios of data channels of the at least one port group to a reference signal; and the sending the channel state information CSI to the base station includes:

sending multiple sets of channel state information CSI to the base station, where each set of channel state information CSI is obtained according to one set of power ratios among the multiple sets of power ratios.

In a fifth possible implementation manner, with reference to the fourth aspect or any one of the first possible implementation manner to the fourth possible implementation manner, the channel state information CSI includes: any one or any combination of a channel quality indicator CQI, a precoding matrix indicator PMI, and a rank indicator RI.

A fifth aspect provides a network side apparatus. The network side apparatus includes: a determining unit, and a first sending unit, where the determining unit is configured to determine reference signal resource configuration information, where the reference signal resource configuration information includes reference signal port configuration information, where the reference signal port configuration information is used for indicating a mapping relationship between a reference signal port and a port group; and the first sending unit is configured to send, to user equipment, the reference signal resource configuration information determined by the determining unit, so that the user equipment acquires signal quality measurement information according to the reference signal port configuration information.

In a first possible implementation manner, according to the fifth aspect, the reference signal resource configuration information determined by the determining unit further includes: reference signal power information of at least two port groups that is used by the user equipment to acquire the signal quality measurement information according to the reference signal port configuration information and in combination with the reference signal power information of the at least two port groups; and the reference signal power information of the at least two port groups includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

In a second possible implementation manner, with reference to the fifth aspect or the first possible implementation manner, when the signal quality measurement information is a reference signal received power RSRP, the first sending unit is further configured to send, to the user equipment, filter coefficient information that is used by the user equipment to perform, based on the filter coefficient information, filtering on the reference signal received power RSRP and obtain a path loss estimation value.

In a third possible implementation manner, with reference to the second possible implementation manner, the apparatus further includes:

a first receiving unit, configured to receive an uplink physical channel or an uplink physical signal sent by the user equipment, where a transmit power of the uplink physical channel or the uplink physical signal is obtained by means of calculation by the user equipment according to the path loss estimation value.

In a fourth possible implementation manner, with reference to the fifth aspect or the first possible implementation manner, the signal quality measurement information includes:

any one or any combination of a reference signal received power RSRP, a reference signal received quality RSRQ, and a reference signal strength indicator RSSI.

In a fifth possible implementation manner, with reference to the fifth aspect or any one of the first possible implementation manner to the fourth possible implementation manner, the apparatus further includes: a second receiving unit, where the second receiving unit is configured to receive the signal quality measurement information sent by the user equipment.

A sixth aspect provides user equipment. The user equipment includes: a third receiving unit, a first acquiring unit, and a second acquiring unit, where the third receiving unit is configured to receive reference signal resource configuration information sent by a base station, where the reference signal resource configuration information includes reference signal port configuration information, where the reference signal port configuration information is used for indicating a mapping relationship between a reference signal port and a port group;

the first acquiring unit is configured to obtain reference signal port information in at least one port group according to the reference signal port configuration information received by the third receiving unit; and the second acquiring unit is configured to acquire signal quality measurement information according to the reference signal port information, in the at least one port group, obtained by the first acquiring unit.

In a first possible implementation manner, according to the sixth aspect, the first acquiring unit is specifically configured to obtain reference signal port information in one specified port group according to the reference signal port configuration information received by the third receiving unit; and the second acquiring unit is specifically configured to acquire the signal quality measurement information according to the reference signal port information, in the one specified port group, obtained by the first acquiring unit.

In a second possible implementation manner, according to the first possible implementation manner of the sixth aspect, when the signal quality measurement information is a reference signal received power RSRP, the second acquiring unit is specifically configured to:

obtain a reference signal received power RSRP(r,p) of a pth port of an rth receive antenna according to a formula $$RSRP(r, p) = \frac{1}{K_s - 1} \sum_{m=0}^{K_s-1} \hat{h}_p(m) \cdot \hat{h}_p(m+1)$$

and obtain the RSRP by combining RSRP(r,p), where $\hat{h}_p(m)$ is a channel estimation on a reference signal RE whose label number is m, $K_s$ is a total sample quantity of usable reference signal REs in measurement bandwidth, p is a number of a reference signal port in the one specified port group, and r is an index of a receive antenna.

In a third possible implementation manner, with reference to the sixth aspect, the reference signal resource configuration information received by the third receiving unit further includes: reference signal power information of at least two port groups, and the second acquiring unit is further configured to acquire the signal quality measurement information according to the reference signal port configuration information and in combination with the reference signal power information of the at least two port groups.

In a fourth possible implementation manner, with reference to the third possible implementation manner of the sixth aspect, the second acquiring unit is specifically configured to:

obtain, according to the reference signal port configuration information, signal quality measurement information corresponding to the at least two port groups; and perform, according to the reference signal power information of the at least two port groups, weighted averaging on the obtained signal quality measurement information corresponding to the at least two port groups in accordance with a port group power, to obtain the signal quality measurement information.

In a fifth possible implementation manner, with reference to the fourth possible implementation manner of the sixth aspect, the performing, by the second acquiring unit, according to the reference signal power information of the at least two port groups, weighted averaging on the obtained signal quality measurement information corresponding to the at least two port groups in accordance with a port group power, to obtain the signal quality measurement information includes:

obtaining the signal quality measurement information according to a formula $$SQ = \left(\sum_{g=0}^{n-1} p_g \cdot SQ_g\right) \Big/ \left(\sum_{g=0}^{n-1} p_g\right),$$

where $SQ_g$ is signal quality measurement information of a specified port group, g is a sequence number of a specified port group, n is a quantity of specified port groups, n≥2, and $p_g$ is a reference signal power of a specified port group, where the reference signal power of the specified port group is obtained according to the reference signal power information of the at least two port groups.

In a sixth possible implementation manner, with reference to any one of the second possible implementation manner to the fifth possible implementation manner of the sixth aspect, the reference signal power information, of the at least two port groups, received by the third receiving unit includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

In a seventh possible implementation manner, with reference to any one of the sixth aspect to the sixth possible implementation manner, the user equipment further includes: a second sending unit, configured to send the signal quality measurement information to the base station.

In an eighth possible implementation manner, with reference to any one of the sixth aspect to the seventh possible implementation manner, the third receiving unit is further configured to: when the signal quality measurement information is the reference signal received power RSRP, receive filter coefficient information sent by the base station; and the user equipment further includes: a third acquiring unit, where the third acquiring unit is configured to perform, based on the filter coefficient information received by the third receiving unit, filtering on the reference signal received power RSRP, and obtain a path loss estimation value.

In a ninth possible implementation manner, with reference to the eighth possible implementation manner of the sixth aspect, the user equipment further includes: a third sending unit, where the third sending unit is further configured to send an uplink physical channel or an uplink physical signal to the base station, where a transmit power of the uplink physical channel or the uplink physical signal is obtained by means of calculation according to the path loss estimation value.

In a tenth possible implementation manner, with reference to the sixth aspect, the signal quality measurement information includes: a reference signal received power RSRP, a reference signal strength indicator RSSI, or a reference signal received quality RSRQ.

A seventh aspect provides a network side apparatus. The apparatus includes: a fourth sending unit and a fourth receiving unit, where the fourth sending unit is configured to send reference signal resource configuration infatuation to user equipment, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal; and the fourth receiving unit is configured to receive channel state information CSI sent by the user equipment, where the CSI is obtained by the user equipment according to the reference signal port configuration information and the power ratio information.

In a first possible implementation manner, according to the seventh aspect, in the power ratio information:

power ratios of data channels on antenna ports in each port group among the at least one port group to a reference signal are the same; or power ratios of data channels on ports in one port group among the at least one port group and data channels on ports in another port group to a reference signal are the same.

In a second possible implementation manner, according to the seventh aspect or the first possible implementation manner of the seventh aspect, the power ratio information is used for indicating multiple sets of power ratios of data channels of the at least one port group to a reference signal; and the fourth receiving unit is specifically configured to receive multiple sets of channel state information CSI that are sent by the user equipment, where each set of channel state information CSI is obtained by the user equipment according to one set of power ratios among the multiple sets of power ratios.

In a third possible implementation manner, with reference to the seventh aspect or the first possible implementation manner or the second possible implementation manner, the channel state information CSI received by the fourth receiving unit includes: any one or any combination of a channel quality indicator CQI, a precoding matrix indicator PMI, and a rank indicator RI.

An eighth aspect provides user equipment. The user equipment includes: a fifth receiving unit, a fourth acquiring unit, a fifth acquiring unit, and a fifth sending unit, where the fifth receiving unit is configured to receive reference signal resource configuration information sent by a base station, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal;

the fourth acquiring unit is configured to obtain a power ratio of a data channel on each antenna port in the at least one port group to a reference signal according to the reference signal port configuration information and the power ratio information that are received by the fifth receiving unit;

the fifth acquiring unit is configured to obtain channel state information CSI according to the power ratio, of the data channel on each antenna port to the reference signal, obtained by the fourth acquiring unit; and the fifth sending unit is configured to send, to the base station, the channel state information CSI obtained by the fifth acquiring unit.

In a first possible implementation manner, according to the eighth aspect, the fifth acquiring unit is specifically configured to:

obtain, according to the reference signal on each antenna port, a channel measurement value corresponding to each antenna port;

obtain a channel estimation value of the data channel on each antenna port according to the channel measurement value corresponding to each antenna port and the power ratio of the data channel on each antenna port to the reference signal; and obtain the channel state information CSI according to the channel estimation value of the data channel on each antenna port.

In a second possible implementation manner, with reference to the first possible implementation manner, the obtaining, by the fifth acquiring unit, a channel estimation value of the data channel on each antenna port according to the channel measurement value corresponding to each antenna port and the power ratio of the data channel on each antenna port to the reference signal includes:

obtaining a channel estimation value of a data channel on an antenna port p according to a formula $\hat{h}_p = \sqrt{\rho_p} h_p$, where p is an index of the antenna port, $\rho_p$ is a power ratio of the data channel on the antenna port p to a reference signal, $h_p$ is a channel measurement value corresponding to the antenna port p, and $\hat{h}_p$ is a channel estimation value of the data channel on the antenna port p.

In a third possible implementation manner, with reference to the eighth aspect or the first possible implementation manner or the second possible implementation manner, in the power ratio information, power ratios of data channels on antenna ports in each port group among the at least one port group to a reference signal are the same; or power ratios of data channels on ports in one port group among the at least one port group and data channels on ports in another port group to a reference signal are the same.

In a fourth possible implementation manner, with reference to the eighth aspect, the reference signal resource configuration information received by the fifth receiving unit includes: the reference signal port configuration information and the power ratio information, where the power ratio information is used for indicating multiple sets of power ratios of data channels of the at least one port group to a reference signal; and the fifth sending unit is specifically configured to:

send multiple sets of channel state information CSI to the base station, where each set of channel state information CSI is obtained according to one set of power ratios among the multiple sets of power ratios.

In a fifth possible implementation manner, with reference to the eighth aspect or any one of the first possible implementation manner to the fourth possible implementation manner, the channel state information CSI obtained by the fifth acquiring unit includes: any one or any combination of a channel quality indicator CQI, a precoding matrix indicator PMI, and a rank indicator RI.

A ninth aspect provides a network side apparatus. The network side apparatus includes: a receiver, a processor, and a transmitter, where the processor is configured to determine reference signal resource configuration information, where the reference signal resource configuration information includes reference signal port configuration information, where the reference signal port configuration information is used for indicating a mapping relationship between a reference signal port and a port group; and the transmitter is configured to send the reference signal resource configuration information to user equipment, so that the user equipment acquires signal quality measurement information according to the reference signal port configuration information.

In a first possible implementation manner, according to the ninth aspect, the reference signal resource configuration information determined by the processor further includes: reference signal power information of at least two port groups that is used by the user equipment to acquire the signal quality measurement information according to the reference signal port configuration information and in combination with the reference signal power information of the at least two port groups; and the reference signal power information of the at least two port groups includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

In a second possible implementation manner, with reference to the ninth aspect or the first possible implementation manner, when the signal quality measurement information is a reference signal received power RSRP, the transmitter is further configured to send, to the user equipment, filter coefficient information that is used by the user equipment to perform, based on the filter coefficient information, filtering on the reference signal received power RSRP and obtain a path loss estimation value.

In a third possible implementation manner, with reference to the second possible implementation manner, the receiver is configured to receive an uplink physical channel or an uplink physical signal sent by the user equipment, where a transmit power of the uplink physical channel or the uplink physical signal is obtained by means of calculation by the user equipment according to the path loss estimation value.

In a fourth possible implementation manner, with reference to the ninth aspect or the first possible implementation manner, the signal quality measurement information includes:

any one or any combination of a reference signal received power RSRP, a reference signal received quality RSRQ, and a reference signal strength indicator RSSI.

In a fifth possible implementation manner, with reference to the ninth aspect or any one of the first possible implementation manner to the fourth possible implementation manner, the receiver is further configured to receive the signal quality measurement information sent by the user equipment.

A tenth aspect provides user equipment. The user equipment includes: a receiver, a processor, and a transmitter, where the receiver is configured to receive reference signal resource configuration information sent by a base station, where the reference signal resource configuration information includes reference signal port configuration information, where the reference signal port configuration information is used for indicating a mapping relationship between a reference signal port and a port group; and the processor is configured to obtain reference signal port information in at least one port group according to the reference signal port configuration information; and acquire signal quality measurement information according to the reference signal port information in the at least one port group.

In a first possible implementation manner, according to the tenth aspect, the processor is specifically configured to:

obtain reference signal port information in one specified port group according to the reference signal port configuration information; and acquire the signal quality measurement information according to the reference signal port information in the one specified port group.

In a second possible implementation manner, according to the first possible implementation manner of the tenth aspect, when the signal quality measurement information is a reference signal received power RSRP, the acquiring, by the processor, the signal quality measurement information according to the reference signal port information in the one specified port group includes:

obtaining a reference signal received power RSRP(r,p) of a pth port of an rth receive antenna according to a formula $$RSRP(r, p) = \frac{1}{K_s - 1} \sum_{m=0}^{K_s-1} \hat{h}_p(m) \cdot \hat{h}_p(m+1)$$

and obtaining the RSRP by combining RSRP(r,p), where $\hat{h}_p(m)$ is a channel estimation on a reference signal RE whose label number is m, $K_s$ is a total sample quantity of usable reference signal REs in measurement bandwidth, p is a number of a reference signal port in the one specified port group, and r is an index of a receive antenna.

In a third possible implementation manner, with reference to the tenth aspect, the reference signal resource configuration information received by the receiver further includes: reference signal power information of at least two port groups that is used by the user equipment to acquire the signal quality measurement information according to the reference signal port configuration information and in combination with the reference signal power information of the at least two port groups.

In a fourth possible implementation manner, with reference to the third possible implementation manner of the tenth aspect, the acquiring, by the processor, the signal quality measurement information according to the reference signal port configuration information and in combination with the reference signal power information of the at least two port groups includes:

obtaining, according to the reference signal port configuration information, signal quality measurement information corresponding to the at least two port groups; and performing, according to the reference signal power information of the at least two port groups, weighted averaging on the obtained signal quality measurement information corresponding to the at least two port groups in accordance with a port group power, to obtain the signal quality measurement information.

In a fifth possible implementation manner, with reference to the fourth possible implementation manner of the tenth aspect, the performing, by the processor, according to the reference signal power information of the at least two port groups, weighted averaging on the obtained signal quality measurement information corresponding to the at least two port groups in accordance with a port group power, to obtain the signal quality measurement information includes:

obtaining the signal quality measurement information according to a formula $$SQ = \left(\sum_{g=0}^{n-1} p_g \cdot SQ_g\right) \bigg/ \left(\sum_{g=0}^{n-1} p_g\right),$$

where $SQ_g$ is signal quality measurement information of a specified port group, g is a sequence number of a specified port group, n is a quantity of specified port groups, n≥2, and $p_g$ is a reference signal power of a specified port group, where the reference signal power of the specified port group is obtained according to the reference signal power information of the at least two port groups.

In a sixth possible implementation manner, with reference to any one of the second possible implementation manner to the fifth possible implementation manner of the tenth aspect, the reference signal power information, of the at least two port groups, received by the receiver includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

In a seventh possible implementation manner, with reference to any one of the tenth aspect to the sixth possible implementation manner, the transmitter is configured to send the signal quality measurement information to the base station.

In an eighth possible implementation manner, with reference to any one of the tenth aspect to the seventh possible implementation manner, when the signal quality measurement information is the reference signal received power RSRP, the receiver is further configured to receive filter coefficient information sent by the base station; and the processor is further configured to perform, based on the filter coefficient information, filtering on the reference signal received power RSRP, and obtain a path loss estimation value.

In a ninth possible implementation manner, with reference to the eighth possible implementation manner of the tenth aspect, the transmitter is further configured to send an uplink physical channel or an uplink physical signal to the base station, where a transmit power of the uplink physical channel or the uplink physical signal is obtained by means of calculation according to the path loss estimation value.

In a tenth possible implementation manner, with reference to the tenth aspect, the signal quality measurement information includes: a reference signal received power RSRP, a reference signal strength indicator RSSI, or a reference signal received quality RSRQ.

An eleventh aspect provides a network side apparatus. The network side apparatus includes: a transmitter and a receiver, where the transmitter is configured to send reference signal resource configuration information to user equipment, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal; and the receiver is configured to receive channel state information CSI sent by the user equipment, where the CSI is obtained by the user equipment according to the reference signal port configuration information and the power ratio information.

In a first possible implementation manner, according to the eleventh aspect, in the power ratio information:

power ratios of data channels on antenna ports in each port group among the at least one port group to a reference signal are the same; or power ratios of data channels on ports in one port group among the at least one port group and data channels on ports in another port group to a reference signal are the same.

In a second possible implementation manner, according to the eleventh aspect or the first possible implementation manner of the seventh aspect, the power ratio information is used for indicating multiple sets of power ratios of data channels of the at least one port group to a reference signal; and the receiving, by the receiver, channel state information CSI sent by the user equipment includes: receiving multiple sets of channel state information CSI that are sent by the user equipment, where each set of channel state information CSI is obtained by the user equipment according to one set of power ratios among the multiple sets of power ratios.

In a third possible implementation manner, with reference to the eleventh aspect or the first possible implementation manner or the second possible implementation manner, the channel state information CSI received by the receiver includes: any one or any combination of a channel quality indicator CQI, a precoding matrix indicator PMI, and a rank indicator RI.

A twelfth aspect provides user equipment. The user equipment includes: a receiver, a processor, and a transmitter, where the receiver is configured to receive reference signal resource configuration information sent by a base station, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal;

the processor is configured to obtain a power ratio of a data channel on each antenna port in the at least one port group to a reference signal according to the reference signal port configuration information and the power ratio information, and obtain channel state information CSI according to the power ratio of the data channel on each antenna port to the reference signal; and the transmitter is configured to send the channel state information CSI to the base station.

In a first possible implementation manner, according to the twelfth aspect, the obtaining, by the processor, channel state information CSI according to the power ratio of the data channel on each antenna port to the reference signal includes:

obtaining, according to the reference signal on each antenna port, a channel measurement value corresponding to each antenna port;

obtaining a channel estimation value of the data channel on each antenna port according to the channel measurement value corresponding to each antenna port and the power ratio of the data channel on each antenna port to the reference signal; and obtaining the channel state information CSI according to the channel estimation value of the data channel on each antenna port.

In a second possible implementation manner, with reference to the first possible implementation manner, the obtaining, by the processor, a channel estimation value of the data channel on each antenna port according to the channel measurement value corresponding to each antenna port and the power ratio of the data channel on each antenna port to the reference signal includes:

obtaining a channel estimation value of a data channel on an antenna port p according to a formula $\hat{h}_p = \sqrt{\rho_p} h_p$, where p is an index of the antenna port, $\rho_p$ is a power ratio of the data channel on the antenna port p to a reference signal, $h_p$ is a channel measurement value corresponding to the antenna port p, and $\hat{h}_p$ is a channel estimation value of the data channel on the antenna port p.

In a third possible implementation manner, with reference to the twelfth aspect or the first possible implementation manner or the second possible implementation manner, in the power ratio information, power ratios of data channels on antenna ports in each port group among the at least one port group to a reference signal are the same; or power ratios of data channels on ports in one port group among the at least one port group and data channels on ports in another port group to a reference signal are the same.

In a fourth possible implementation manner, with reference to the twelfth aspect, the power ratio information is used for indicating multiple sets of power ratios of data channels of the at least one port group to a reference signal; and the transmitter is specifically configured to:

send multiple sets of channel state information CSI to the base station, where each set of channel state information CSI is obtained according to one set of power ratios among the multiple sets of power ratios.

In a fifth possible implementation manner, with reference to the twelfth aspect or any one of the first possible implementation manner to the fourth possible implementation manner, the channel state information CSI obtained by the processor includes: any one or any combination of a channel quality indicator CQI, a precoding matrix indicator PMI, and a rank indicator RI.

According to the method and apparatus for measuring communication quality provided in the embodiments of the present invention, reference signal resource configuration information is sent to UE on a user side, and the UE may perform processing according to reference signal quality, of one port group or multiple port groups, in the reference signal resource configuration information to obtain final signal quality measurement information, so that a UE side can distinguish ports according to different port groups, which differs from a case in which transmit powers of different ports cannot be distinguished in the prior art. Therefore, in one aspect, UE is enabled to acquire signal quality measurement information, so that the UE can perform more accurate cell selection and uplink power control; in another aspect, the UE is enabled to acquire channel state information, so that the UE can perform more accurate modulation and coding scheme (MCS) selection or scheduling, thereby increasing a throughput of a system.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
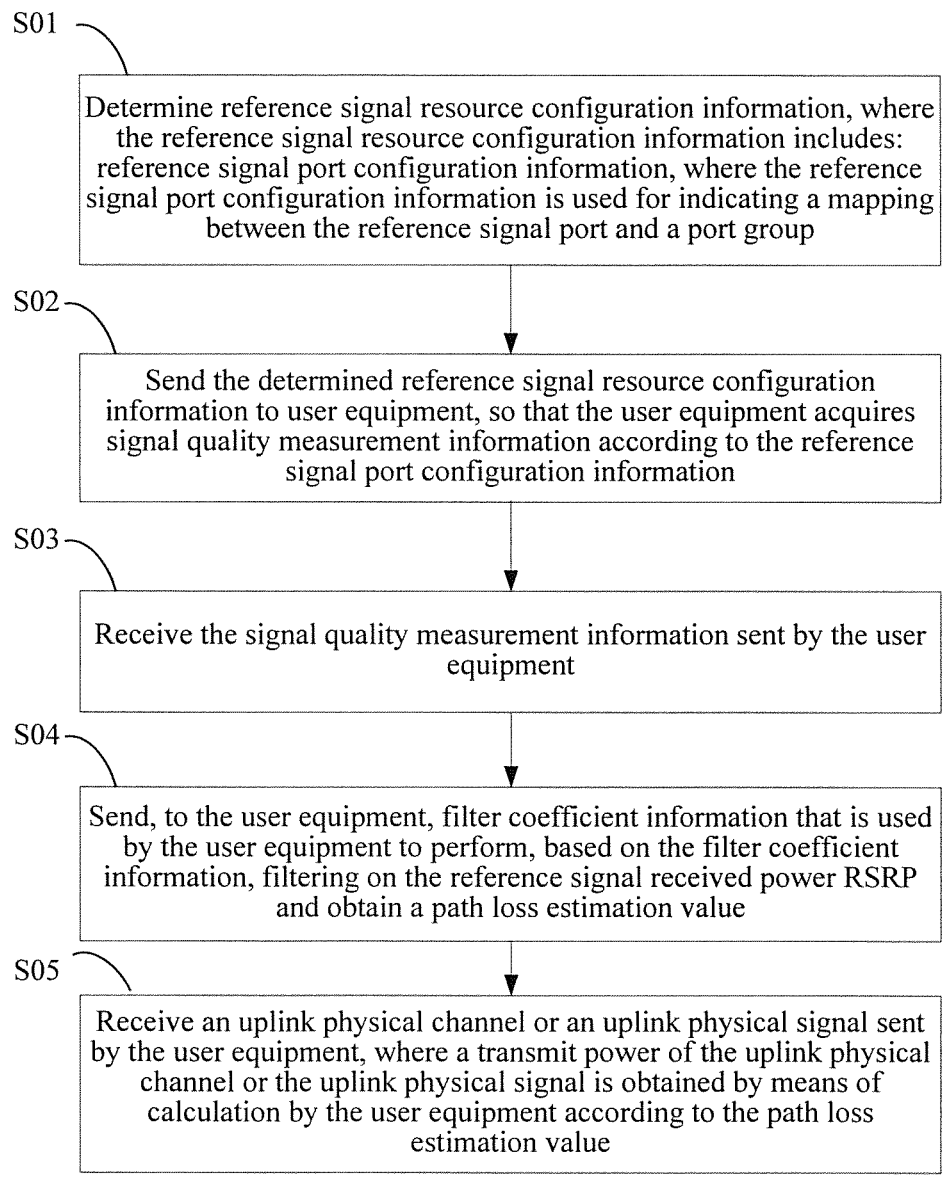
FIG. 1 is a flowchart of a method for measuring communication quality according to Embodiment 1 of the present invention.

An embodiment of the present invention provides a method for measuring communication quality. As shown in FIG. 1, the method includes:

Step S01: Determine reference signal resource configuration information, where the reference signal resource configuration information includes: reference signal port configuration information, where the reference signal port configuration information is used for indicating a mapping between the reference signal port and a port group.

The operation may specifically be executed on a base station side or a network side (for example, a Universal Terrestrial Radio Access Network (UTRAN)), or an evolved UTRAN, or an evolved node B.

When the reference signal resource configuration information includes the reference signal port configuration information, and optionally, the reference signal resource configuration information may further include reference signal power information of at least one port group, the reference signal resource configuration information is sent to user equipment (UE), so that the user equipment acquires signal quality measurement information according to the reference signal resource configuration information. Because reference signal ports are allocated to multiple groups, the UE may perform processing according to reference signal quality, of one port group or multiple port groups, in the reference signal resource configuration information to obtain final signal quality measurement information, so that a UE side can distinguish ports according to different port groups, which differs from a case in which transmit powers of different ports cannot be distinguished in the prior art. Therefore, the signal quality measurement information acquired in the solution enables the UE to perform more accurate cell selection and uplink power control.

It should be further understood that for detailed description of the reference signal port configuration information included in the reference signal resource configuration information, reference may be made to the description of step 101 in Embodiment 2.

Further, the reference signal resource configuration information may further include: any one of a reference signal configuration and a reference signal subframe configuration.

Therefore, the UE can receive a reference signal according to the information. It should be understood that, however, this embodiment of the present invention does not limit that any one of the reference signal configuration and the reference signal subframe configuration is necessarily delivered to the UE by using the reference signal resource configuration information, and may also be delivered to the UE in a form of other information. It should be pointed out that the reference signal configuration or the reference signal subframe configuration may also be predefined, or is implicitly derived according to a parameter, for example, a cell ID or a UE ID, that is known in advance, and is known to both a base station and the UE, which is not limited in this embodiment of the present invention.

Step S02: Send the determined reference signal resource configuration information to user equipment, so that the user equipment acquires signal quality measurement information according to the reference signal port configuration information.

Specifically, the foregoing signal quality measurement information may include:

any one or any combination of a reference signal received power RSRP, a reference signal received quality RSRQ, and a reference signal strength indicator RSSI.

According to the method described in Embodiment 1 above, in the method, reference signal resource configuration information is determined on a network side, and the reference signal resource configuration information is sent to a user side, where the reference signal resource configuration information includes reference signal port configuration information, where the reference signal port configuration information is used for indicating a mapping between the reference signal port and a port group. In the method, it can be avoided that reference signal power related information is indicated port by port, so as to reduce a signaling overhead; further, a uniform power indicator is used for ports in a port group, and for different port groups, power related information of the port groups may be indicated independently, so that full use of an antenna configuration or an antenna array structure is made, thereby enabling a system to flexibly select reference signal power related information according to the antenna configuration or the antenna array structure; because an antenna array may have symmetric weights, by means of the symmetry of the weights, design complexity in beamforming or side lobe suppression can be reduced.

Further, the reference signal resource configuration information is sent to UE on the user side, and the UE may perform processing according to reference signal quality of at least one port group in the reference signal resource configuration information to obtain final signal quality measurement information, so that a UE side can distinguish ports according to different port groups, which differs from a case in which transmit powers of different ports cannot be distinguished in the prior art. The UE is enabled to acquire signal quality measurement information, so that the UE can perform more accurate cell selection and uplink power control.

Optionally, the method further includes:

Step S03: Receive the signal quality measurement information sent by the user equipment.

Optionally, when the signal quality measurement information is a reference signal received power RSRP, the method further includes:

Step S04: Send, to the user equipment, filter coefficient information that is used by the user equipment to perform, based on the filter coefficient information, filtering on the reference signal received power RSRP and obtain a path loss estimation value.

Specifically, the filter coefficient information may be sent to the user equipment at a same time when the determined reference signal resource configuration information is sent to the user equipment in step S02, for example, the filter coefficient information and the determined reference signal resource configuration information are sent in a same subframe; or may be sent before or after the determined reference signal resource configuration information is sent to the user equipment in step S02. The filter coefficient information and the reference signal resource configuration information may be sent in an information element (IE) of same or different higher layer signaling such as RRC signaling, or same or different downlink control information (DCI).

Optionally, the method further includes:

Step S05: Receive an uplink physical channel or an uplink physical signal sent by the user equipment, where a transmit power of the uplink physical channel or the uplink physical signal is obtained by means of calculation by the user equipment according to the path loss estimation value.

Optionally, the reference signal resource configuration information further includes: reference signal power information of at least two port groups that is used by the user equipment to acquire the signal quality measurement information according to the reference signal port configuration information and in combination with the reference signal power information of the at least two port groups; and the reference signal power information of the at least two port groups includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

Optionally, the reference signal port configuration information is a single index, or is a double index, or is an index after combined coding.

Optionally, the reference signal power information of the port group at least includes: reference signal powers of ports in one port group are the same.

The first port group is one port group among the at least one port group.

Embodiment 2

Figure 2:
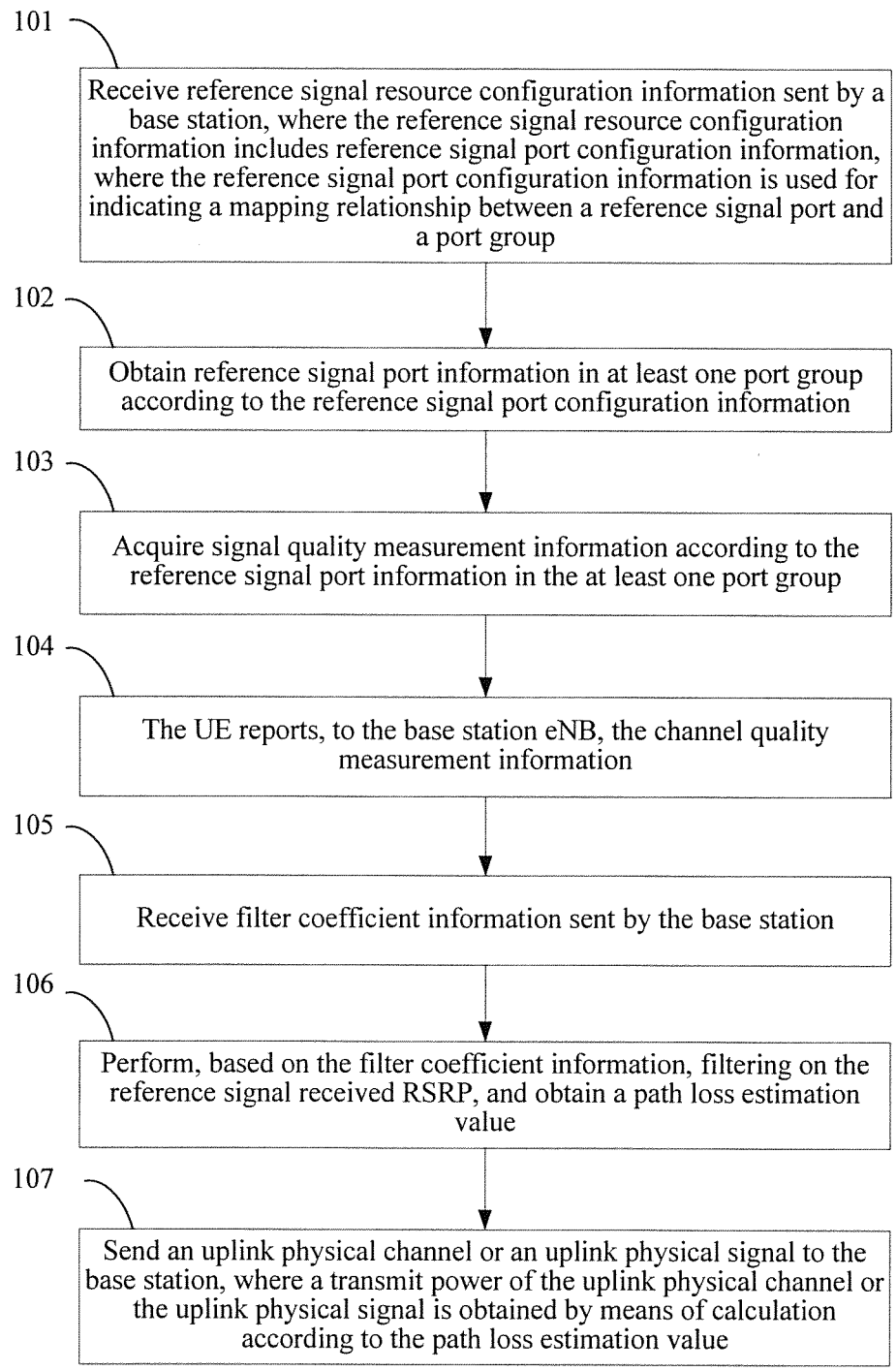
FIG. 2 is a flowchart of a method for measuring communication quality according to Embodiment 2 of the present invention.

This embodiment of the present invention provides a method for measuring communication quality. As shown in FIG. 2, the method includes:

Step 101: Receive reference signal resource configuration information sent by a base station, where the reference signal resource configuration information includes reference signal port configuration information, where the reference signal port configuration information is used for indicating a mapping relationship between a reference signal port and a port group.

Specifically, UE receives the reference signal resource configuration information, which may be that the UE receives, by using higher layer signaling (for example, radio resource control (RRC) signaling) or dynamic signaling (for example, downlink control information (DCI), the reference signal resource configuration information notified by an eNB, or obtains, based on a cell identity (ID), the reference signal resource configuration information. The higher layer signaling may be sent by using a data channel such as a physical downlink shared channel (PDCCH for short). The dynamic signaling, for example, the DCI, is sent by using a control channel such as a physical downlink control channel (PDCCH) or an enhanced PDCCH (ePDCCH).

It should be understood that the reference signal port configuration information is used for indicating a mapping between a reference signal port and a port group. The mapping relationship between a reference signal port and a port group may be predefined, and is known to both the base station and the user equipment. Therefore, a base station side and a user equipment side can both find the reference signal port configuration message by means of identification.

It should be further understood that according to information about a mapping relationship between a reference signal port group and a corresponding port, and a mapping index of the port group, a port included in the port group may be uniquely determined. As shown in Tables 1 to 3, after learning the information about the mapping relationship between a reference signal port group and a corresponding port, and the mapping index of the port group, a device can learn a port in the corresponding port group. Ports included in the port group may be predefined, and for a different index, a predefined port group may be obtained according to planning. It should be noted that one reference signal port corresponds to one antenna port, and one antenna port corresponds to one reference signal port. Channel information of an antenna signal port is obtained by means of measurement of a reference signal port. Therefore, usually the predefined port group may be obtained according to planning of an antenna port array configuration.

Figure 3:
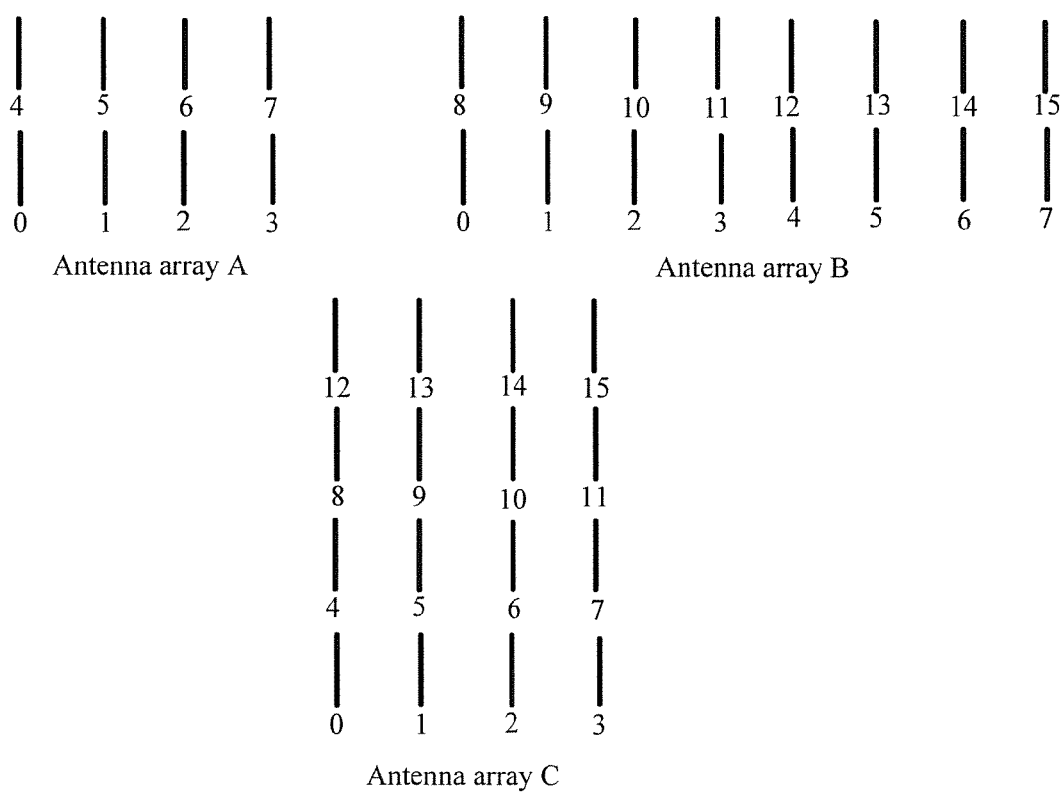
FIG. 3 is a brief schematic diagram of different uniform linear array antenna array configurations.
Figure 4:
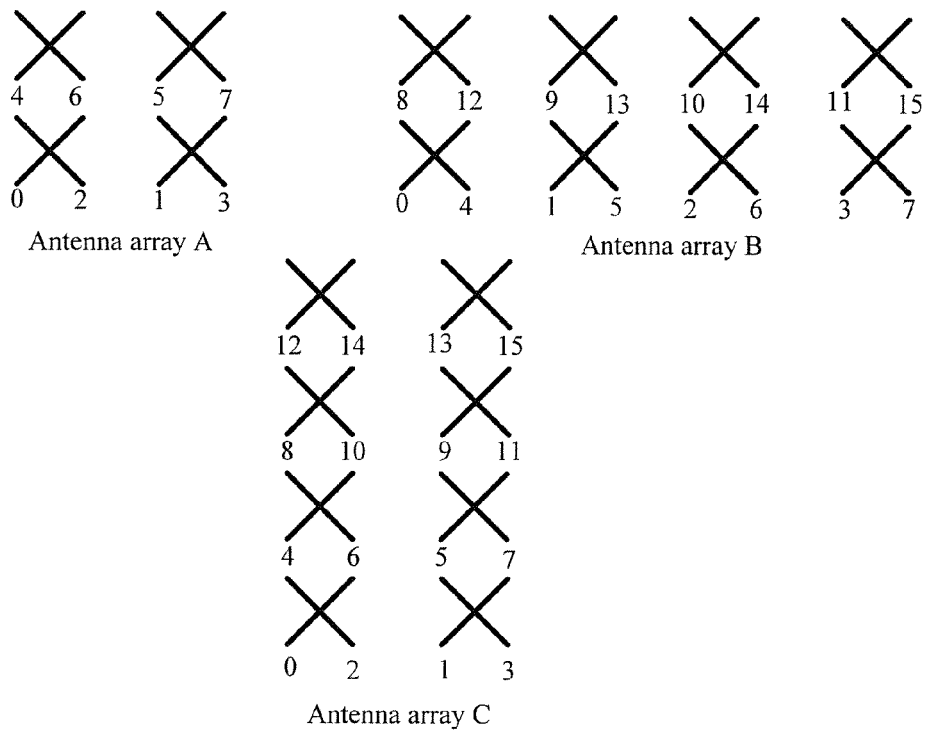
FIG. 4 is a brief schematic diagram of different cross-polarization antenna array configurations.

One reference signal port or antenna port usually corresponds to one physical antenna or one virtual antenna, where the virtual antenna may be obtained by means of weighted combination of multiple physical antennas. An actual antenna deployment may have a different antenna configuration and antenna port array form. For example, FIG. 3 shows different uniform linear array (ULA) antenna port array configurations. An antenna port array A is a 2-row 4-column uniform linear array, an antenna port array B is a 2-row 8-column uniform linear array, and an antenna port array C is a 4-row 4-column uniform linear array. Although both the antenna port array B and the antenna port array C have 16 ports, array forms of the antenna port array B and the antenna port array C are also different. For another example, FIG. 4 shows different cross-polarization (XPO) antenna array configurations. An antenna port array A is a 2-row 2-column cross-polarization antenna array, an antenna port array B is a 2-row 4-column uniform linear array, and an antenna port array C is a 4-row 2-column uniform linear array. Different polarization antennas may be located in a same column. Although both the antenna port array B and the antenna port array C have 16 ports, array forms of the antenna port array B and the antenna port array C are also different. The antenna port array is referred to as an antenna array for short below.

Optionally, as another embodiment, the reference signal port configuration information includes a quantity of reference signal ports and a mapping index, where the mapping index is used for indicating a mapping between a reference signal port group and a corresponding port. 8-antenna arrays represented by the antenna array A shown in FIG. 3 and the antenna array A shown in FIG. 4 are used as examples. The reference signal port configuration information includes: a quantity of reference signal ports is 8 and a mapping index is 0 or 1. The predefined mapping relationship between a reference signal port and a port group may be defined by using a function, or may be regulated by using a predefined table. For example, as shown in Table 1, the first row may be the reference signal port configuration information of the antenna array A in FIG. 3, and the mapping indication information includes: a quantity of reference signal ports is 8, a mapping index is 0, and two port groups are a port group 0 and a port group 1. The second row in Table 1 may be the reference signal port configuration information of the antenna array A in FIG. 4, and the mapping indication information includes: a quantity of reference signal ports is 8, a mapping index is 1, and two port groups are a port group 0 and a port group 1. It should be pointed out that, in this embodiment, a reference signal port and a reference signal port group may be interchangeable with an antenna port and an antenna port group.

TABLE 1

Mapping between a port and a port group

| Index | Mapping between a port and a port group | |
|---|---|---|
| | 0 | 1 |
| 0 | 0, 3, 4, 7 | 1, 2, 5, 6 |
| 1 | 0, 1, 4, 5 | 2, 3, 6, 7 |

Further, when a mapping index value is 0, the port group 0 includes reference signal ports (or antenna ports) 0, 3, 4, and 7, the port group 1 includes reference signal ports (or antenna ports) 1, 2, 5, and 6; when a mapping index value is 1, the port group 0 includes reference signal ports (or antenna ports) 0, 1, 4, and 5, the port group 1 includes reference signal ports (or antenna ports) 2, 3, 6, and 7.

16-antenna arrays represented by the antenna array B or the antenna array C shown in FIG. 3 and the antenna array B or the antenna array C shown in FIG. 4 are used as examples. The reference signal port configuration information includes: a quantity of reference signal ports is 16, and a mapping index is 0 or 1 or 2 or 3. The predefined mapping relationship between a reference signal port and a port group may be defined by using a function, or may be regulated by using a predefined table, for example, as shown in Table 2:

TABLE 2

Mapping between a port and a port group

| Index | Mapping between a port and a port group | | | |
|---|---|---|---|---|
| | 0 | 1 | 2 | 3 |
| 0 | 0, 3, 8, 11 | 4, 7, 12, 15 | 1, 2, 9, 10 | 5, 6, 13, 14 |
| 1 | 0, 1, 12, 13 | 2, 3, 14, 15 | 4, 5, 8, 9 | 6, 7, 10, 11 |
| 2 | 0, 7, 8, 15 | 1, 6, 9, 14 | 2, 5, 10, 13 | 3, 4, 11, 12 |
| 3 | 0, 3, 12, 15 | 1, 2, 13, 14 | 4, 7, 8, 11 | 5, 6, 9, 10 |

It may be assumed that the antenna array B in FIG. 3 is the first row in Table 2, that is, a mapping index value is 0, a port group 0 includes reference signal ports (or antenna ports) 0, 3, 8, and 11, a port group 1 includes reference signal ports (or antenna ports) 4, 7, 12, and 15, a port group 2 includes reference signal ports (or antenna ports) 1, 2, 9, and 10, and a port group 3 includes reference signal ports (or antenna ports) 5, 6, 13, and 14. When the mapping index value is 1 or 2 or 3, reference signal ports included in each port group may be sequentially obtained by analogy from the foregoing Table.

Optionally, as another embodiment, the reference signal port configuration information may include a port group mapping double index (m, n). In this case, the predefined mapping relationship between a reference signal port and a port group may be defined by using a function, or may be regulated by using a predefined table, for example, as shown in Table 3:

TABLE 3

Mapping between a port and a port group

| Double index | Mapping between a port and a port group | | | |
|---|---|---|---|---|
| (m, n) | 0 | 1 | 2 | 3 |
| (2, 4) | 0, 1, 4, 5 | 2, 3, 6, 7 | — | — |
| (2, 8) | 0, 3, 8, 11 | 4, 7, 12, 15 | 1, 2, 9, 10 | 6, 7, 10, 11 |
| (4, 4) | 0, 1, 12, 13 | 2, 3, 14, 15 | 4, 5, 8, 9 | 6, 7, 10, 11 |

Optionally, the double index (m, n) may indicate that a quantity of reference signal ports is a product of m and n.

Further, combined coding may be performed on the double index information. For example, combined coding of the double index in Table 3 above is shown in Table 3a or 3b.

TABLE 3a

Mapping between a port and a port group

| Combined coding of a double index (m, n) | Double index (m, n) | Mapping between a port and a port group | | | |
|---|---|---|---|---|---|
| | | 0 | 1 | 2 | 3 |
| 0 | (2, 4) | 0, 1, 4, 5 | 2, 3, 6, 7 | — | — |
| 1 | (2, 8) | 0, 3, 8, 11 | 4, 7, 12, 15 | 1, 2, 9, 10 | 6, 7, 10, 11 |
| 2 | (4, 4) | 0, 1, 12, 13 | 2, 3, 14, 15 | 4, 5, 8, 9 | 6, 7, 10, 11 | or

TABLE 3b

Mapping between a port and a port group

| Mapping index | Double index (m, n) | Mapping between a port and a port group | | | |
|---|---|---|---|---|---|
| | | 0 | 1 | 2 | 3 |
| 0 | (2, 4) | 0, 1, 4, 5 | 2, 3, 6, 7 | — | — |
| 1 | (2, 8) | 0, 3, 8, 11 | 4, 7, 12, 15 | 1, 2, 9, 10 | 6, 7, 10, 11 |
| 2 | (4, 4) | 0, 1, 12, 13 | 2, 3, 14, 15 | 4, 5, 8, 9 | 6, 7, 10, 11 |

Optionally, grouping of port groups may be that 4 reference signal ports (or antenna ports) are used as one port group.

It should be further pointed out that grouping of port groups may also be not limited to a port group including 4 reference signal ports, or may be a port group having 2 or 8 ports or in another formation. In addition, a number of a reference signal port included in each port group is also not limited to the foregoing value, and may be flexibly selected according to an actual antenna configuration or deployment. The foregoing predefined port group mapping and mapping indication information may enable a system to adapt to more antenna configurations and antenna array deployments.

Optionally, the reference signal resource configuration information may further include: any one of a reference signal configuration and a reference signal subframe configuration. The reference signal configuration may include: any one of a subcarrier used by a reference signal port, an orthogonal frequency division multiplexing (OFDM) symbol, and a code resource. The reference signal subframe configuration may include: any one of a subframe position occupied by a reference signal port, a subframe period, and a subframe offset. It should be pointed out that the reference signal configuration or the reference signal subframe configuration may also be predefined, or is implicitly derived according to a parameter, for example, a cell ID or a UE ID, that is known in advance, and is known to both the base station and the UE, which is not limited in this embodiment of the present invention.

Step 102: Obtain reference signal port information in at least one port group according to the reference signal port configuration information.

Step 103: Acquire signal quality measurement information according to the reference signal port information in the at least one port group.

Specifically, the reference signal or signal may specifically include a cell-specific reference signal CSR, or a channel state information reference signal (CSI-RS), or a demodulation reference signal (DMRS), but is not limited to current examples.

The signal quality measurement information may be a reference signal received power (RSRP) or a reference signal received quality (RSRQ) or a reference signal strength indicator (RSSI), or may also be other signal quality measurement information defined based on a reference signal.

In this embodiment, a reference signal received power RSRP is used as an example and one implementation is described in detail. This solution is not limited to another implementation solution, and a solution of acquiring other signal quality measurement information is also not limited.

Optionally, the obtaining reference signal port information in at least one port group according to the reference signal port configuration information in step 102 may include:

obtaining reference signal port information in one specified port group according to the reference signal port configuration information; and the acquiring signal quality measurement information according to the reference signal port information in the at least one port group in step 103 includes:

acquiring the signal quality measurement information according to the reference signal port information in the one specified port group.

For example, a mapping index in Table 2 is 0, and in this case, reference signal ports included in a port group 0 are 0, 3, 8, and 11. Complex RSRP measurement of each antenna port may be correlation between two adjacent reference signal resource elements (RE, Resource Element). The two adjacent REs herein may refer to two adjacent REs in a frequency domain, or two adjacent REs in a time domain, or two adjacent REs in a time-frequency domain.

$$RSRP(r, p) = \frac{1}{K_s - 1} \sum_{m=0}^{K_s-1} \hat{h}_p(m) \cdot \hat{h}_p(m+1), \, p = 0, 3, 8, 11 \quad (1)$$

where $\hat{h}_p(m)$ is a channel estimation on a reference signal RE whose label number is $K_s$ is a total sample quantity of usable reference signal REs in measurement bandwidth, p is a number of a reference signal port in the one specified port group, and r is an index of a receive antenna. An RSRP corresponding to the antenna port group 0 may be obtained by combining (combine) RSRP(r,p). Specifically, a reference signal received power RSRP (r,p) of a pth port of an rth receive antenna is obtained and the RSRP is obtained by combining RSRP(r,p). For example, for RSRP(r,p) above, linear (correlated or uncorrelated) averaging is performed on ports p and receive antennas, and then an absolute value is taken, to obtain the RSRP corresponding to the port group 0. Alternatively, for RSRP(r,p) above, linear (correlated or uncorrelated) averaging is performed on one port p and receive antennas, and then an absolute value is taken, to obtain the RSRP corresponding to the port group 0. By means of sequential analogy, the RSRP may also be obtained by using reference signals of another port group.

In step 103 in this embodiment, the port group used for obtaining an RSRP and a port in the port group may be predefined (for example, the port group 0, and the port 0 in the port group 0, or the ports 0 and 3 in the port group 0, or all the ports in the port group 0, or others) or notified by a base station eNB by using higher layer signaling such as RRC signaling or by using downlink control information. In the foregoing, an RSRP is obtained based on one port group or some or all ports in one port group, and RSRPs do not need to be measured port by port, so that implementation complexity in measuring an RSRP by UE can be reduced; at the same time, a port group is predefined or notified, so that the UE and the eNB have consistent understanding of measurement, thereby ensuring consistency in measurement of RSRPs. At the same time, for different port groups, powers of the port groups may be independently indicated, and full use of antenna configurations and antenna array structures shown in FIG. 3 and FIG. 4 is made, so as to adapt to changes in an antenna structure to perform flexible indication, thereby ensuring that the base station eNB can adapt to multiple antenna configurations and antenna arrays.

Optionally, reference signal power information, of one or more port groups, included in the reference signal resource configuration information received by the UE in step 101 is used for indicating a reference signal power of ports in a corresponding port group.

16 reference signal ports are used as an example, and reference signal powers of 4 port groups may be shown in Table 4:

TABLE 4

Table of reference signal powers of port groups

| Port group number | 0 | 1 | 2 | 3 |
|---|---|---|---|---|
| Reference signal power | p0 | p1 | p2 | p3 |

In this case, a power of a reference signal port included in a port group 0 is p0, and powers of reference signal ports included in port groups 1, 2, and 3 may be sequentially obtained by analogy, which are respectively p1, p2, and p3.

Alternatively, reference signal power information of the foregoing one or more port groups may also be jointly represented by using a reference signal power of one port group (for example, the port group 0) among the one or more port groups and a ratio of a reference signal power of another port group (for example, the port group 1) to the reference signal power of the port group (for example, the port group 0) or ratios of reference signal powers of multiple port groups (for example, the port groups 1, 2, and 3) to the reference signal power of the port group (for example, the port group 0). For example, the reference signal power of the port group 0 is p0, the ratios of the reference signal powers of the port groups 1, 2, and 3 to the reference signal power of the port group 0 are respectively p1, p2, and p3. In this case, the UE may obtain that the reference signal powers of the port groups 1, 2, and 3 are respectively p0*ρ1, p0*ρ2, and p0*ρ3.

In addition, reference signal power information of the one or more port groups may also be represented by using a reference signal power of one port group (for example, the port group 0) among the one or more port groups and a differential between a reference signal power of another port group (for example, the port group 1) and the reference signal power of the port group (for example, the port group 0) or differentials between reference signal powers of multiple port groups (for example, the port groups 1, 2, and 3) and the reference signal power of the port group (for example, the port group 0). For example, the reference signal power of the port group 0 is p0, the differentials between the reference signal powers of the port groups 1, 2, and 3 and the reference signal power of the port group 0 are respectively d1, d2, and d3. In this case, the UE may obtain that the reference signal powers of the port groups 1, 2, and 3 are respectively p0+d1, p0+d2, and p0+d3.

It is used above that reference signal power information is separately indicated for port groups, and it can be avoided that reference signal powers are indicated port by port, so as to reduce a signaling overhead; further, a uniform power indicator is used for ports in a port group, and for different port groups, different port groups powers may be independently indicated, so that full use of an antenna configuration or an antenna array structure is made, thereby enabling a system to flexibly select a reference signal power according to the antenna configuration or the antenna array structure. In addition, it should be further pointed that that grouping of port groups is not limited to a port group including 4 reference signal ports, and the grouping of port groups and the formation of the ports in Tables 1, 2, and 3 above may further enable the antenna arrays in FIG. 3 or FIG. 4 to have powers symmetric about array structures, that is, the ports may have symmetric weights relative to the array, and by means of the symmetry of the weights, design complexity in beamforming or side lobe suppression can be reduced.

Further, the reference signal power above may also be represented by using an energy per resource element (EPRE).

Optionally, reference signal power information of at least two port groups includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

Optionally, the foregoing acquiring the signal quality measurement information according to the reference signal port configuration information and in combination with the reference signal power information of the at least two port groups includes:

obtaining, according to the reference signal port configuration information, signal quality measurement information corresponding to the at least two port groups; and performing, according to the reference signal power information of the at least two port groups, weighted averaging on the obtained signal quality measurement information corresponding to the at least two port groups in accordance with a port group power, to obtain the signal quality measurement information.

Specifically, the signal quality measurement information may be obtained by combining reference signal received powers of more than one port group.

For example, there are 4 port groups in total: port groups 0, 1, 2, and 3. Based on the foregoing method for obtaining an RSRP of one port group, reference signal received powers $RSRP_g$ corresponding to the port groups 0, 1, 2, and 3 may be separately obtained, where g=0, 1, 2, 3. The reference signal resource configuration information received according to step 101 further includes: reference signal power information of at least two port groups that is used by the user equipment to acquire the signal quality measurement information according to the reference signal port configuration information and in combination with the reference signal power information of the at least two port groups.

The performing, according to the reference signal power information of the at least two port groups, weighted averaging on the obtained signal quality measurement information corresponding to the at least two port groups in accordance with a port group power, to obtain the signal quality measurement information includes:

according to a formula $$SQ = \left(\sum_{g=0}^{n-1} p_g \cdot SQ_g\right) / \left(\sum_{g=0}^{n-1} p_g\right) \quad (2)$$

obtaining the signal quality measurement information, where $SQ_g$ is signal quality measurement information of a specified port group, g is a sequence number of a specified port group, n is a quantity of specified port groups, n≥2, and $p_g$ is a reference signal power of a specified port group, where the reference signal power of the specified port group is obtained according to the reference signal power information of the at least two port groups.

The multiple port groups above may be all port groups, or may be some port groups. Therefore, preset port information may be information about all port groups, or may be information about some port groups. The some port groups may be agreed in advance (for example, the port group 0 and the port group 1) or notified by the base station eNB by using higher layer signaling such as RRC signaling or by using downlink control information. In the foregoing, RSRPs of the multiple port groups are obtained, and processing such as smoothing or filtering may be performed on the RSRP obtained for each port group, so as to further increase precision of measuring an RSRP; at the same time, it is avoided that the UE performs calculation port by port, thereby lowering implementation complexity. In addition, a configuration of a port group can ensure that the base station eNB can adapt to multiple antenna configurations and antenna arrays.

Likewise, a similar method is used. Based on the reference signal port configuration information in the reference signal resource configuration information and a reference signal configuration or a subframe configuration, a reference signal sent by the base station is received, and the UE may further obtain signal quality measurement information, such as a reference signal received quality (RSRQ) or a reference signal strength indicator (RSSI), of one or more port groups. The RSSI is a received total wideband power, including a power of interference and a power of thermal noise, and the RSRQ is a ratio of an RSRP to the RSSI.

Further, the method for measuring communication quality may further include:

Step 104: The UE reports, to a base station eNB, the channel quality measurement information, for example, an RSRP, so as to help implement cell selection or cell handover.

Optionally, when the signal quality measurement information is the reference signal received power RSRP, the method for measuring communication quality may further include:

Step 105: Receive filter coefficient information sent by the base station.

Step 106: Perform, based on the filter coefficient information, filtering on the reference signal received power RSRP, and obtain a path loss estimation value.

Specifically, the user equipment may receive filter coefficient information sent by the base station at the same time when the reference signal resource configuration information is received in step 101, for example, the filter coefficient information and the reference signal resource configuration information are received in a same subframe. The filter coefficient information sent by the base station may also be received before or after the reference signal resource configuration information is received in step 101. The filter coefficient information and the reference signal resource configuration information may be received in an information element (IE) of same or different higher layer signaling such as RRC signaling, or same or different downlink control information (DCI).

Specifically, for the method in step 103, a reference signal received power of one or more port groups may be obtained, for example, reference signal received powers $RSRP_g$ corresponding to port groups 0, 1, 2, and 3 may be obtained, where g=0, 1, 2, 3.

The path loss estimation may be obtained based on a reference signal received power of one port group and a corresponding reference signal power:

PL(g)=a reference signal power of a port group g—a higher layer filtered RSRP of the port group g.

where PL(g) represents the PL estimation obtained based on the port group g, where a higher layer filtering parameter is notified by using higher layer signaling. A PL estimation may be obtained by using a PL of one port group, for example, the port group 0. The higher layer filtered RSRP of the port group g is obtained by performing filtering on the RSRP of the port group g by using the higher layer filter parameter notified by using the higher layer signaling.

The foregoing port group for obtaining a PL estimation may be predefined (for example, the port group 0) or notified by the base station eNB by using higher layer signaling such as RRC signaling or by using downlink control information. A PL estimation is obtained above based on one port group, which can reduce implementation complexity of PL estimation by UE, and ensure consistency of PL estimation. In addition, a configuration of a port group can ensure that the base station eNB can adapt to multiple antenna configurations and antenna arrays.

The path loss estimation may also be obtained based on reference signal received powers of multiple port groups and corresponding reference signal powers. Specifically, the PL estimation may be a linear average of PL estimations obtained for the multiple port groups.

The multiple port groups above may be all port groups, or may be some port groups. The some port groups may be agreed in advance (for example, the port group 0 and the port group 1) or notified by the base station eNB by using higher layer signaling such as RRC signaling or by using downlink control information. In the foregoing, PL estimations are obtained for multiple port groups, which can further increase precision of PL estimation, and avoid excessively high complexity of implementation by UE. In addition, a configuration of a port group can ensure that the base station eNB can adapt to multiple antenna configurations and antenna arrays.

Further, the method for measuring communication quality may further include:

Step 107: Send an uplink physical channel or an uplink physical signal to the base station, where a transmit power of the uplink physical channel or the uplink physical signal is obtained by means of calculation according to the path loss estimation value.

The physical channel may be a physical uplink control channel PUCCH, a physical uplink shared channel PUSCH, or the like. The physical signal may be a sounding reference signal (SRS) or a demodulation reference signal (DMRS) that is used for the uplink physical channel.

Specifically, according to the foregoing obtained path loss estimation, a setting of the transmit power of the physical uplink control channel PUCCH may be defined as the following formula (3):

$$P_{PUCCH}(i) = \min\{P_{CMAX,c}(i), P_{O\_PUCCH} + PL_c + h(n_{CQI}, n_{HARQ}, n_{SR}) + \Delta_{F\_PUCCH}(F) + \Delta_{TxD}(F') + g(i)\}$$

where $P_{CMAX,c}(i)$ is a maximum transmit power configured on UE in a subframe i of a serving cell c, and $P_{O\_PUCCH}$ is a parameter forming by the sum of a cell-specific parameter $P_{O\_NOMINAL\_PUCCH}$ provided by a higher layer and a UE specific parameter $P_{O\_UE\_PUCCH}$. $h(n_{CQI}, n_{HARQ}, n_{SR})$ is a value dependent on a PUCCH format, where $n_{CQI}$ corresponds to a quantity of information bits of a CQI. For the parameter $n_{SR}$, $n_{SR}=1$ if subframe i is configured for SR for the UE not having any associated transport block for UL-SCH, or otherwise $n_{SR}=0$. The parameter $n_{HARQ}$ is a quantity of HARQ-ACK bits sent in the subframe i. The parameter $\Delta_{F\_PUCCH}(F)$ is provided by a higher layer, and a value of each $\Delta_{F\_PUCCH}(F)$ corresponds to a PUCCH format (F). For the parameter $\Delta_{TxD}(F')$, if the UE is configured by a higher layer to transmit a PUCCH on two antenna ports, a value of $\Delta_{TxD}(F')$ is provided by a higher layer, where each PUCCH format F' is predefined; otherwise, $\Delta_{TxD}(F')=0$. $g(i)$ is a current PUCCH power control state of the UE. $PL_c$ is an estimation value, of a path loss, obtained for the cell C by the UE by using the method in step 104.

For another example, according to the foregoing obtained path loss estimation, a setting of the transmit power of the physical uplink shared channel PUSCH may be defined as the following formula (4):

$$P_{PUSCH,c}(i) \min\{P_{CMAX,c}(i), 10\log_{10}(M_{PUSCH,c}(i)) + P_{O\_PUSCH,c}(j) + \alpha_c(j) + PL_c + \Delta_{TF,c}(i) + f_c(i)\}$$

where $P_{CMAX,c}(i)$ is a maximum transmit power configured on UE in a subframe i of a serving cell c; $M_{PUSCH,c}(i)$ is the bandwidth of the PUSCH resource assignment expressed in number of resource blocks valid for subframe i and serving cell C. $P_{O\_PUSCH,c}(j)$ is a parameter formed by a component $P_{O\_NOMINAL\_PUSCH,c}(j)$ and a component $P_{O\_UE\_PUSCH,c}(j)$ that are provided by a higher layer, where j=0, 1. $\alpha_c \in \{0, 0.4, 0.5, 0.6, 0.7, 0.8, 0.9, 1\}$ is a 3-bit parameter, and is provided by a higher layer. $\Delta_{TF,c}(i)$ is a parameter that is determined by using higher layer signaling and related to a transmission format. $f_c(i)$ is a current PUSCH power control adjustment state of the UE. $PL_c$ is an estimation value, of a path loss, obtained for the cell C by the UE by using the method in step 104.

For still another example, according to the foregoing obtained path loss estimation, a setting of a transmit power of a sounding reference signal SRS may be defined as the following formula:

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}$$

where $P_{SRS\_OFFSET,c}(m)$ is a parameter semi-statically configured by a higher layer for a serving cell c, where m=0 and m=1. For SRS transmission, if a trigger type is 0, m=0; if a trigger type 1, m=1. $M_{SRS,c}$ is bandwidth of SRS transmission of a subframe i of the serving cell c. $f_c(i)$ is a current PUSCH power control adjustment state of the serving cell c. $P_{O\_PUSCH,c}(j)$ and $\alpha_c(j)$ are predefined parameters, for example, it is defined in Section 5.1.1.1 in LTE 36213 that j=1. $PL_c$ is an estimation value, of a path loss, obtained for the cell C by the UE by using the method in step 104.

The above path loss estimation is used for open-loop control of an uplink channel, which can further improve reliability of power control, and ensure that the base station eNB can adapt to multiple antenna configurations and antenna arrays.

Embodiment 3

Figure 5:
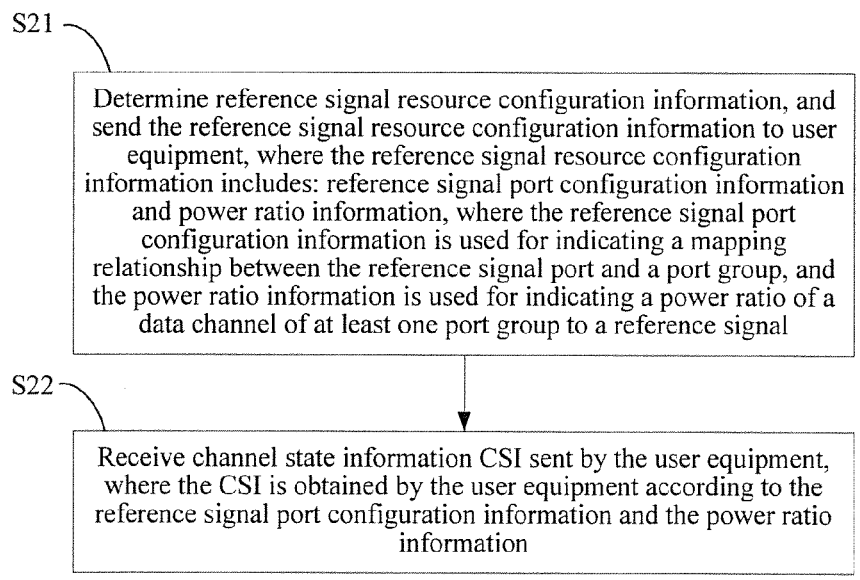
FIG. 5 is a flowchart of a method for measuring communication quality according to Embodiment 3 of the present invention.

This embodiment of the present invention provides a method for measuring communication quality. As shown in FIG. 5, the method includes:

Step S21: Determine reference signal resource configuration information, and send the reference signal resource configuration information to user equipment, where the reference signal resource configuration information includes: reference signal port configuration information and power ratio information, where the reference signal port configuration information is used for indicating a mapping between the reference signal port and a port group, and the power ratio information is used for indicating a power ratio of a data channel of at least one port group to a reference signal.

When the reference signal resource configuration information includes: the reference signal port configuration information and the power ratio information, the reference signal resource configuration information is sent to the user equipment (UE), so that the user equipment acquires channel state information CSI according to the reference signal resource configuration information. Because reference signal ports are allocated to multiple groups, the UE may perform processing according to reference signal quality, of one port group or multiple port groups, in the reference signal resource configuration information to obtain final signal quality measurement information, so that a UE side can distinguish ports according to different port groups, which differs from a case in which transmit powers of different ports cannot be distinguished in the prior art. Therefore, channel state information acquired in the solution may enable the UE to perform more accurate modulation and coding scheme (MCS) selection or scheduling, thereby increasing a throughput of a system.

Step S22: Receive channel state information CSI sent by the user equipment, where the CSI is obtained by the user equipment according to the reference signal port configuration information and the power ratio information.

The channel state information CSI includes: any one or any combination of a channel quality indicator CQI, a precoding matrix indicator PMI, and a rank indicator RI.

According to the method described in Embodiment 3 above, in the method, reference signal resource configuration information is determined on a network side, and the reference signal resource configuration information is sent to a user side, where the reference signal resource configuration information at least includes: reference signal power related information of a port group, and reference signal port configuration information, where the reference signal port configuration information is used for indicating a mapping between the reference signal port and a port group. In the method, it can be avoided that reference signal power related information is indicated port by port, so as to reduce a signaling overhead; further, a uniform power indicator is used for ports in a port group, and for different port groups, power related information of the port groups may be indicated independently, so that full use of an antenna configuration or an antenna array structure is made, thereby enabling a system to flexibly select reference signal power related information according to the antenna configuration or the antenna array structure; because an antenna array may have symmetric weights, by means of the symmetry of the weights, design complexity in beamforming or side lobe suppression can be reduced.

Further, the reference signal resource configuration information is sent to UE on the user side, and the UE may perform processing according to reference signal quality, of one port group or multiple port groups, in the reference signal resource configuration information to obtain final signal quality measurement information, so that a UE side can distinguish ports according to different port groups, which differs from a case in which transmit powers of different ports cannot be distinguished in the prior art. The UE is enabled to acquire channel state information, so that the UE can perform more accurate modulation and coding scheme (MCS) selection or scheduling, thereby increasing a throughput of a system.

Optionally, the reference signal port configuration information is a single index, or is a double index, or is an index after combined coding. Refer to Embodiment 1 for the detailed description, which is no longer repeated herein.

Optionally, in step S21, in the power ratio information:

power ratios of data channels on antenna ports in each port group among the at least one port group to a reference signal are the same; or power ratios of data channels on ports in one port group among the at least one port group and data channels on ports in another port group to a reference signal are the same.

Optionally, the power ratio information is used for indicating multiple sets of power ratios of data channels of the at least one port group to a reference signal; and the receiving channel state information CSI sent by the user equipment includes: receiving multiple sets of channel state information CSI that are sent by the user equipment, where each set of channel state information CSI is obtained by the user equipment according to one set of power ratios among the multiple sets of power ratios.

The "multiple sets" in this embodiment refers to use of multiple sets of values. For the multiple sets of values, multiple sets of signaling having a same format may be used. For example, a signaling format is: power ratios of data channels on ports in at least one port group to a reference signal are the same, that is, powers of ports in a port group are the same; and another signaling format is: power ratios of data channels on ports in one port group and data channels on ports in another port group to a reference signal are the same; however, powers of ports in a port group are different.

Two different signaling formats are listed as examples in the foregoing, and they may be understood as specific examples of this embodiment, and should not be construed as limitations to this embodiment.

Embodiment 4

This embodiment of the present invention provides a method for measuring communication quality. The method is similar to Embodiment 2 above, and a difference lies in that, after receiving reference signal resource configuration information sent by a network side, UE on a user side uses the information to acquire channel state information, so that the UE can perform corresponding modulation and coding scheme MCS selection or resource scheduling according to the channel state information.

Figure 6:
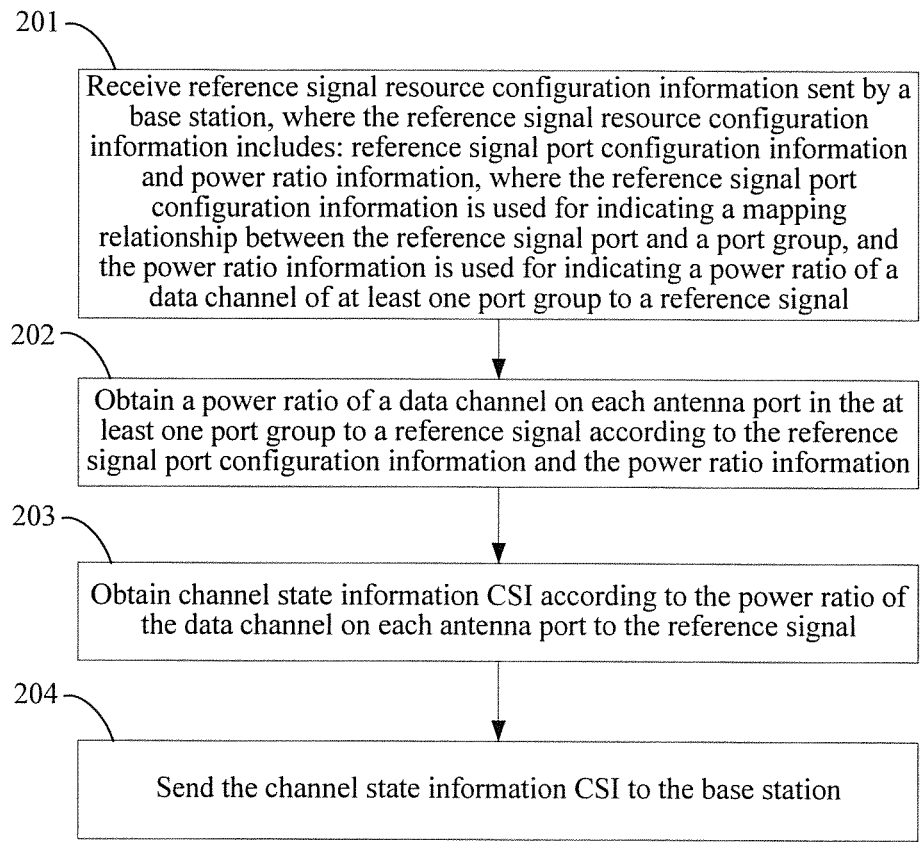
FIG. 6 is a flowchart of a method for measuring communication quality according to Embodiment 4 of the present invention.

As shown in FIG. 6, the method includes:

Step 201: Receive reference signal resource configuration information sent by a base station, where the reference signal resource configuration information includes: reference signal port configuration information and power ratio information, where the reference signal port configuration information is used for indicating a mapping between the reference signal port and a port group, and the power ratio information is used for indicating a power ratio of a data channel of at least one port group to a reference signal.

For detailed description of the reference signal port configuration information included in the reference signal resource configuration information, reference may be made to the description of the reference signal port configuration information in step 101. That is, the reference signal port configuration information is used for indicating the mapping between a reference signal port and a port group, and the mapping relationship between a reference signal port and a port group is predefined.

The data channel may be a physical downlink shared channel (PDSCH), or may be a channel used for transmitting control information. A power of a data channel may be an energy per resource element (EPRE).

Specifically, the UE receives a reference signal resource configuration, which may be that the UE receives, by using higher layer signaling such as radio resource control (RRC) signaling or dynamic signaling such as downlink control information (DCI), the reference signal resource configuration notified by an eNB, or obtains, based on a cell identity ID, the reference signal resource configuration.

Specifically, the reference signal port configuration information is used for indicating the mapping between the reference signal port and a port group.

One reference signal port usually corresponds to one physical antenna or one virtual antenna, where the virtual antenna may be obtained by means of weighted combination of multiple physical antennas. An actual antenna deployment may have a different antenna configuration and an antenna array form. It should be pointed out that, in this embodiment, a reference signal port and a reference signal port group may be interchangeable with an antenna port and an antenna port group.

Optionally, the reference signal port configuration information is used for indicating the mapping relationship between the reference signal port and a port group, and may include a quantity of reference signal ports and a mapping index, where the mapping index is used for indicating a mapping between a reference signal port group and a corresponding port. 8-antenna arrays represented by an antenna array A shown in FIG. 3 and an antenna array A shown in FIG. 4 are used as examples, and the reference signal port configuration information includes: a quantity of reference signal ports is 8 and a mapping index is 0 or 1. The predefined mapping relationship between a reference signal port and a port group may be defined by using a function, or may be regulated by using a predefined table, as shown in Table 1.

16-antenna arrays represented by an antenna array B or an antenna array C shown in FIG. 3 and an antenna array B or an antenna array C shown in FIG. 4 are used as examples, and the reference signal port configuration information includes: a quantity of reference signal ports is 16 and a mapping index is 0 or 1 or 2 or 3. The predefined mapping relationship between a reference signal port and a port group may be defined by using a function, or may be regulated by using a predefined table, as shown in Table 2.

Specifically, the reference signal port configuration information may include a double index (m, n). In this case, the predefined mapping relationship between a reference signal port and a port group may be defined by using a function, or may be regulated by using a predefined table, as shown in Table 3.

Further, the double index (m, n) may indicate that a quantity of reference signal ports is a product of m and n.

Further, for the double index information, combined coding may be performed, for example, combined coding of the double index in Table 3 above is shown in Table 3a or 3b.

Optionally, grouping of port groups may be that 4 reference signal ports/antenna ports form one port group.

It should be further pointed out that grouping of port groups is not limited to a port group including 4 reference signal ports, or may be a port group having 2 or 8 ports or in another formation. In addition, a number of a reference signal port included in each port group is also not limited to the foregoing value, and may be flexibly selected according to an actual antenna configuration or deployment. The foregoing predefined port group mapping and mapping indication information may enable a system to adapt to more antenna configurations and antenna array deployments.

In the power ratio information in step 201, power ratios of data channels on antenna ports in each port group among the at least one port group to a reference signal are the same. 16 reference signal ports are used as an example, and it is assumed that a data channel is a PDSCH, and a power corresponds to an EPRE, so that a signal power ratio of a 4-port group may be:

TABLE 4

| Power ratio | | | | |
|---|---|---|---|---|
| Port group number | 0 | 1 | 2 | 3 |
| A ratio of an EPRE of a PDSCH to an EPRE of a reference signal | ρ0 | ρ1 | ρ2 | ρ3 |

Further, power ratios of data channels on each antenna port in the at least one port group to a reference signal are equal. Table 4 is used as an example, where power ratios of data channels on ports in a port group 0 to a reference signal may be equal.

Optionally, as another embodiment, in the power ratio information in step 201, power ratios of data channels on ports in one port group among the at least one port group and data channels on ports in another port group to a reference signal are the same.

Specifically, a port group having 4 ports is used as an example. For example, ports of a port group 0 are 0, 1, 4, and 5, and ports of a port group 1 are 2, 3, 6, and 7. Power ratios of data channels in the port group 0 to a reference signal are shown in Table 4a.

TABLE 4a

| Power ratio of a port group 0 | | | | |
|---|---|---|---|---|
| Port number | 0 | 1 | 4 | 5 |
| A ratio of an EPRE of a PDSCH to an EPRE of a reference signal | ρ0 | ρ1 | ρ2 | ρ3 |

The power ratios of data channels, corresponding to the ports in the port group 0 and the ports in the port group 1, to a reference signal are the same; that is, power ratios of data channels, corresponding to the ports 2, 3, 6, and 7 in the port group 1, to a reference signal are respectively ρ0, ρ1, ρ2, and ρ3.

Optionally, as another embodiment, the power ratio of the data channel in the one or more port groups to the reference signal in step 201 may include multiple sets of values. The sets of values may be values shown in Table 4 or 4a.

In addition, the reference signal resource configuration information may further include: any one of a reference signal configuration and a reference signal subframe configuration. The reference signal configuration may include a subcarrier used by a reference signal port or an OFDM symbol or a code resource. The reference signal subframe configuration may include a subframe position occupied by a reference signal port, a subframe period or a subframe offset. It should be pointed out that the reference signal configuration or the reference signal subframe configuration may also be predefined, or is implicitly derived according to a parameter, for example, a cell ID or a UE ID, that is known in advance, and is known to both the base station and the UE, which is not limited in this embodiment of the present invention.

Step 202: Obtain a power ratio of a data channel on each antenna port in the at least one port group to a reference signal according to the reference signal port configuration information and the power ratio information.

Step 203: Obtain channel state information CSI according to the power ratio of the data channel on each antenna port to the reference signal.

Specifically, the obtaining channel state information CSI according to the power ratio of the data channel on each antenna port to the reference signal may include:

obtaining, according to the reference signal on each antenna port, a channel measurement value corresponding to each antenna port;

obtaining a channel estimation value of the data channel on each antenna port according to the channel measurement value corresponding to each antenna port and the power ratio of the data channel on each antenna port to the reference signal; and obtaining the channel state information CSI according to the channel estimation value of the data channel on each antenna port.

It should be pointed out that the present invention does not limit an execution sequence of obtaining a channel measurement value corresponding to each reference signal port in the at least one port group and obtaining a power ratio of a data channel, corresponding to each antenna port in the at least one port group, to a reference signal.

Specifically, the reference signal may specifically include a cell-specific reference signal CSR, or a received channel state information reference signal (CSI-RS), or a demodulation reference signal (DMRS).

The channel state information (CSI) may be a channel quality indicator (CQI) or a precoding matrix indicator (PMI) or a rank indicator (RI); or may be other channel state information such as a precoding type indicator (PTI).

Specifically, when calculating channel state information based on a ratio of an EPRE of a PDSCH signal to an EPRE of a channel state information reference signal (CSI-RS), the UE obtains a transmit power of a corresponding PDSCH on an antenna port.

16 reference signal ports are used as an example, and it is assumed that the reference signal port configuration information notified in step 201 includes: a quantity of reference signal ports is 16 and a mapping index is 1; a mapping relationship is shown in Table 2, and power ratios are shown in Table 4. It can be known according to Table 2 and Table 4 that:

EPRE or power ratios of PDSCHs, corresponding to reference signal ports 0, 1, 12, and 13, to a reference signal are ρ0;

EPRE or power ratios of PDSCHs, corresponding to reference signal ports 2, 3, 14, and 15, to a reference signal are ρ1;

EPRE or power ratios of PDSCHs, corresponding to reference signal ports 4, 5, 8, and 9, to a reference signal are ρ2; and EPRE or power ratios of PDSCHs, corresponding to reference signal ports 6, 7, 10, and 11, to a reference signal are ρ3.

It should be noted that the reference signal ports correspond to the antenna ports on a one-to-one basis.

In addition, the UE receives a reference signal according to the reference signal resource configuration information, and a channel measurement value corresponding to each antenna port may be obtained as follows:

$$H = [h_0 h_1 \ldots h_{15}]$$

where $h_p$, p=0, ..., 15 is a channel measurement value corresponding to an antenna port p, and the measurement value may be obtained based on a manner such as the least square method according to a specific reference signal such as a CSI RS, which is the prior art and is not further elaborated.

According to the foregoing channel measurement value corresponding to each antenna port, the UE may obtain a channel measurement value or channel estimation value of a data channel PDSCH on each antenna port according to an EPRE or power ratio of the PDSCH to a reference signal, as follows:

$$\hat{H} = [\hat{h}_0 \hat{h}_1 \ldots \hat{h}_{15}]$$

where a channel measurement value or channel estimation value $\hat{h}_p$ of a data channel PDSCH on the antenna port p is:

$$\hat{h}_p = \sqrt{\rho_p} h_p$$

where ρ is an index of the antenna port, $\rho_p$ is a power ratio of the data channel on the antenna port p to a reference signal, $h_p$ is a channel measurement value corresponding to the antenna port p, and $\hat{h}_p$ is a channel estimation value of the data channel on the antenna port p; that is, $$\hat{h}_p = \begin{cases} \sqrt{\rho 0}\, h_p, & p = 0, 1, 12, 13 \\ \sqrt{\rho 1}\, h_p, & p = 2, 3, 14, 15 \\ \sqrt{\rho 2}\, h_p, & p = 4, 5, 8, 9 \\ \sqrt{\rho 3}\, h_p, & p = 6, 7, 10, 11 \end{cases}$$

the UE may calculate channel state information CSI based on the following equation (5):

$$y = \hat{H} P s + n \tag{5}$$

where P is a precoding matrix, and for a non-precoding system, P is a unit array; S is a sent information symbol, for example, a modulation symbol; n is interference and noise vectors; and y is a received signal.

The channel state information, for example, any one or any combination of a channel quality indicator (CQI) or a precoding matrix indicator (PMI)/a rank indicator (RI) is obtained according to the equation (5) above. A specific process of obtaining channel state information, for example, a CQI or a PMI or an RI according to the equation (5) above is the prior art, which is no longer further elaborated herein.

Optionally, as another embodiment, the power ratio information is used for indicating multiple sets of power ratios of data channels of the at least one port group to a reference signal.

16 reference signal ports are used as an example, and it is assumed that the reference signal port configuration information notified in step 201 includes: a quantity of reference signal ports is 16 and a mapping index is 1; a mapping relationship is shown in Table 2, and power ratios are shown in Table 4b. It can be known according to Table 2 and Table 4b that:

EPRE ratios or a first set of power ratios of PDSCHs, corresponding to reference signal ports 0, 1, 12, and 13, to a reference signal are x0;

EPRE ratios or a first set of power ratios of PDSCHs, corresponding to reference signal ports 2, 3, 14, and 15, to a reference signal are x1;

EPRE ratios or a first set of power ratios of PDSCHs, corresponding to reference signal ports 4, 5, 8, and 9, to a reference signal are x2;

EPRE ratios or a first set of power ratios of PDSCHs, corresponding to reference signal ports 6, 7, 10, and 11, to a reference signal are x3;

EPRE ratios or a second set of power ratios of PDSCHs, corresponding to reference signal ports 0, 1, 12, and 13, to a reference signal are y0;

EPRE ratios or a second set of power ratios of PDSCHs, corresponding to reference signal ports 2, 3, 14, and 15, to a reference signal are y1;

EPRE ratios or a second set of power ratios of PDSCHs, corresponding to reference signal ports 4, 5, 8, and 9, to a reference signal are y2; and EPRE ratios or a second set of power ratios of PDSCHs, corresponding to reference signal ports 6, 7, 10, and 11, to a reference signal are y3.

TABLE 4b

| Multiple sets of power ratios of a port group 0 | | | | |
|---|---|---|---|---|
| Port number | 0 | 1 | 4 | 5 |
| A first ratio of an EPRE of a PDSCH to an EPRE of a reference signal | x0 | x1 | x2 | x3 |

TABLE 4b-continued

| Multiple sets of power ratios of a port group 0 | | | | |
|---|---|---|---|---|
| Port number | 0 | 1 | 4 | 5 |
| A second ratio of an EPRE of a PDSCH to an EPRE of a reference signal | y0 | y1 | y2 | y3 |

Step 204: Send the channel state information CSI to the base station.

Specifically, the channel state information may be sent to the base station by using a physical uplink control channel PUCCH or a physical uplink shared channel PUSCH.

Optionally, the sending the channel state information CSI to the base station includes: sending multiple sets of channel state information CSI to the base station, where each set of channel state information CSI is obtained according to one set of power ratios among the multiple sets of power ratios.

16 reference signal ports are used as an example, and it is assumed that the reference signal port configuration information notified in step 201 includes: a quantity of reference signal ports is 16 and a mapping index is 1; a mapping relationship is shown in Table 2, and power ratios are shown in Table 4b. It can be known according to Table 2 and Table 4b that UE sends two sets of channel state information CSI to the base station. The first set of CSI is calculated according to a first set of power ratios in Table 4c below:

TABLE 4c

| First set of power ratios of a port group 0 | | | | |
|---|---|---|---|---|
| Port number | 0 | 1 | 4 | 5 |
| A ratio of an EPRE of a PDSCH to an EPRE of a reference signal | x0 | x1 | x2 | x3 |

The second set of CSI is calculated according to a second set of power ratios in Table 4d:

TABLE 4d

| Second set of power ratios of a port group 0 | | | | |
|---|---|---|---|---|
| Port number | 0 | 1 | 4 | 5 |
| A ratio of an EPRE of a PDSCH to an EPRE of a reference signal | y0 | y1 | y2 | y3 |

In the foregoing, a port group is used to separately indicate a ratio of a power of a data channel to a power of a reference signal, which can reduce a signaling overhead and enable a system to flexibly configure a signal power according to an antenna configuration or an antenna array structure. In addition, it should be further pointed out that although grouping of a port group is not limited to a port group including 4 reference signal ports, grouping of port groups and formation of ports in Tables 1, 2, and 3 above may further enable the antenna arrays in FIG. 3 or FIG. 4 to have powers symmetric about array structures, that is, the ports may have symmetric weights relative to the array, so as to implement beamforming or side lobe suppression.

Embodiment 5

Figure 7:
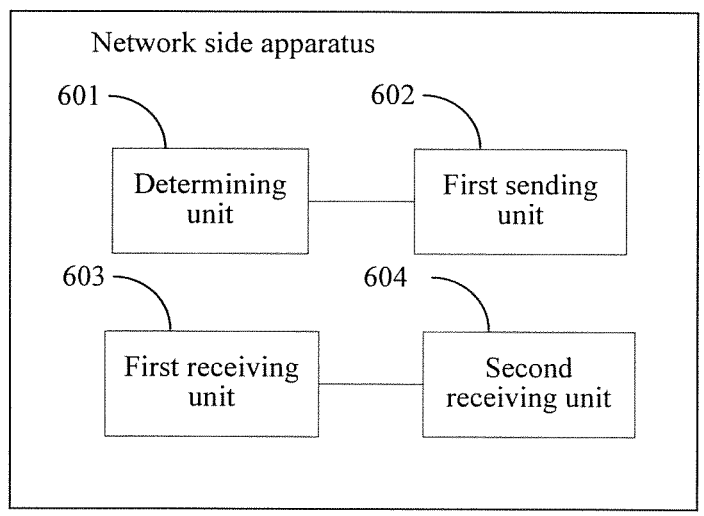
FIG. 7 is a brief schematic diagram of a network side apparatus according to Embodiment 5 of the present invention.

This embodiment of the present invention provides a network side apparatus. As shown in FIG. 7, the apparatus includes: a determining unit 601 and a first sending unit 602.

The determining unit 601 is configured to determine reference signal resource configuration information, where the reference signal resource configuration information includes reference signal port configuration information, where the reference signal port configuration information is used for indicating a mapping relationship between a reference signal port and a port group.

The first sending unit 602 is configured to send, to user equipment, the reference signal resource configuration information determined by the determining unit 601, so that the user equipment acquires signal quality measurement information according to the reference signal port configuration information.

The network side apparatus described in this embodiment may be a base station on a network side, and reference may be made to the description of the corresponding steps in Embodiment 1 for implementation of functions of units of the network side apparatus, which is no longer repeated herein.

In the apparatus described in Embodiment 5 above, reference signal resource configuration information is determined on a network side, and the reference signal resource configuration information is sent to a user side, where the reference signal resource configuration information includes reference signal port configuration information, where the reference signal port configuration information is used for indicating a mapping relationship between a reference signal port and a port group. The apparatus can avoid that reference signal power related information is indicated port by port, so as to reduce a signaling overhead; further, a uniform power indicator is used for ports in a port group, and for different port groups, power related information of the port groups may be indicated independently, so that full use of an antenna configuration or an antenna array structure is made, thereby enabling a system to flexibly select reference signal power related information according to the antenna configuration or the antenna array structure; because an antenna array may have symmetric weights, by means of the symmetry of the weights, design complexity in beamforming or side lobe suppression can be reduced.

Further, the reference signal resource configuration information is sent to UE on the user side, and the UE may perform processing according to reference signal quality, of at least one port group, in the reference signal resource configuration information to obtain final signal quality measurement information, so that a UE side can distinguish ports according to different port groups, which differs from a case in which transmit powers of different ports cannot be distinguished in the prior art. The UE is enabled to acquire signal quality measurement information, so that the UE can perform more accurate cell selection and uplink power control.

Optionally, the reference signal resource configuration information determined by the determining unit 601 further includes: reference signal power information of at least two port groups that is used by the user equipment to acquire the signal quality measurement information according to the reference signal port configuration information and in combination with the reference signal power information of the at least two port groups; and the reference signal power information of the at least two port groups includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

Optionally, when the signal quality measurement information is a reference signal received power RSRP, the first sending unit 602 is further configured to send, to the user equipment, filter coefficient information that is used by the user equipment to perform, based on the filter coefficient information, filtering on the reference signal received power RSRP and obtain a path loss estimation value.

Optionally, the apparatus further includes:

a first receiving unit 603, configured to receive an uplink physical channel or an uplink physical signal sent by the user equipment, where a transmit power of the uplink physical channel or the uplink physical signal is obtained by means of calculation by the user equipment according to the path loss estimation value.

Optionally, the signal quality measurement information includes:

any one or any combination of a reference signal received power RSRP, a reference signal received quality RSRQ, and a reference signal strength indicator RSSI.

Optionally, the apparatus further includes: a second receiving unit 604, where the second receiving unit 604 is configured to receive the signal quality measurement information sent by the user equipment.

The first receiving unit 603 and the second receiving unit 604 may be integrated in a same physical module, or may be regarded as being implemented by using a same module; the description of the first receiving unit and the second receiving unit is used for better understanding of connection relationships among modules in the network side apparatus.

Embodiment 6

Figure 8:
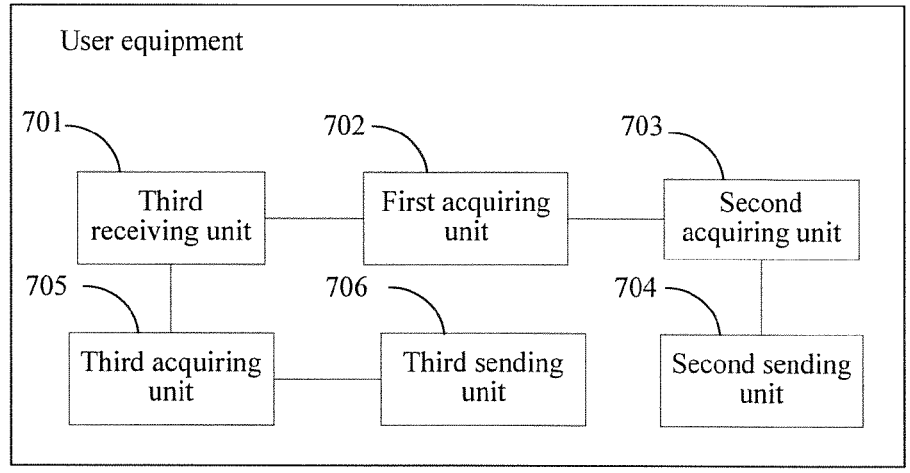
FIG. 8 is a brief schematic diagram of user equipment according to Embodiment 6 of the present invention.

This embodiment of the present invention provides user equipment. As shown in FIG. 8, the user equipment includes: a third receiving unit 701, a first acquiring unit 702, and a second acquiring unit 703.

The third receiving unit 701 is configured to receive reference signal resource configuration information sent by a base station, where the reference signal resource configuration information includes reference signal port configuration information, where the reference signal port configuration information is used for indicating a mapping relationship between a reference signal port and a port group.

The first acquiring unit 702 is configured to obtain reference signal port information in at least one port group according to the reference signal port configuration information received by the third receiving unit 701.

The second acquiring unit 703 is configured to acquire signal quality measurement information according to the reference signal port information, in the at least one port group, obtained by the first acquiring unit 702.

For the user equipment described in this embodiment, reference may be made to the description of the corresponding steps in Embodiment 2 for implementation of functions of units of the user equipment, which is no longer repeated herein.

The apparatus described in Embodiment 6 above receives reference signal resource configuration information determined on a network side, where the reference signal resource configuration information includes reference signal port configuration information, where the reference signal port configuration information is used for indicating a mapping relationship between a reference signal port and a port group. The apparatus can avoid that reference signal power related infatuation is indicated port by port, so as to reduce a signaling overhead; further, a uniform power indicator is used for ports in a port group, and for different port groups, power related information of the port groups may be indicated independently, so that full use of an antenna configuration or an antenna array structure is made, thereby enabling a system to flexibly select reference signal power related information according to the antenna configuration or the antenna array structure; because an antenna array may have symmetric weights, by means of the symmetry of the weights, design complexity in beamforming or side lobe suppression can be reduced.

Further, the reference signal resource configuration information is sent to UE on a user side, and the UE may perform processing according to reference signal quality, of at least one port group, in the reference signal resource configuration information to obtain final signal quality measurement information, so that a UE side can distinguish ports according to different port groups, which differs from a case in which transmit powers of different ports cannot be distinguished in the prior art. The UE is enabled to acquire signal quality measurement information, so that the UE can perform more accurate cell selection and uplink power control.

Optionally, the first acquiring unit 702 is specifically configured to obtain reference signal port information in one specified port group according to the reference signal port configuration information received by the third receiving unit 701.

The second acquiring unit 703 is specifically configured to acquire the signal quality measurement information according to the reference signal port information, in the one specified port group, obtained by the first acquiring unit 702.

Optionally, when the signal quality measurement information is a reference signal received power RSRP, the second acquiring unit 703 is specifically configured to:

obtain reference signal received power RSRP(r,p) of a pth port of an rth receive antenna according to a formula $$RSRP(r, p) = \frac{1}{K_s - 1} \sum_{m=0}^{K_s - 1} \hat{h}_p(m) \cdot \hat{h}_p(m+1)$$

and obtain the RSRP by combining RSRP(r,p), where $\hat{h}_p(m)$ is a channel estimation on a reference signal RE whose label number is m, $K_s$ is a total sample quantity of usable reference signal REs in measurement bandwidth, p is a number of a reference signal port in the one specified port group, and r is an index of a receive antenna.

Optionally, the reference signal resource configuration information received by the third receiving unit 701 further includes: reference signal power information of at least two port groups.

The second acquiring unit 703 is further configured to acquire the signal quality measurement information according to the reference signal port configuration information and in combination with the reference signal power information of the at least two port groups.

Optionally, the second acquiring unit 703 is specifically configured to:

obtain, according to the reference signal port configuration information, signal quality measurement information corresponding to the at least two port groups; and perform, according to the reference signal power information of the at least two port groups, weighted averaging on the obtained signal quality measurement information corresponding to the at least two port groups in accordance with a port group power, to obtain the signal quality measurement information.

Optionally, the performing, by the second acquiring unit 703, according to the reference signal power information of the at least two port groups, weighted averaging on the obtained signal quality measurement information corresponding to the at least two port groups in accordance with a port group power, to obtain the signal quality measurement information includes:

obtaining the signal quality measurement information according to a formula $$SQ = \left(\sum_{g=0}^{n-1} p_g \cdot SQ_g\right) \bigg/ \left(\sum_{g=0}^{n-1} p_g\right),$$

where $SQ_g$ is signal quality measurement information of a specified port group, g is a sequence number of a specified port group, n is a quantity of specified port groups, n≥2, and $p_g$ is a reference signal power of a specified port group, where the reference signal power of the specified port group is obtained according to the reference signal power information of the at least two port groups.

Optionally, the reference signal power information, of the at least two port groups, received by the third receiving unit 701 includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

Optionally, the user equipment further includes: a second sending unit 704, configured to send the signal quality measurement information to the base station.

Optionally, the third receiving unit 701 is further configured to: when the signal quality measurement information is a reference signal received power RSRP, receive filter coefficient information sent by the base station; and the user equipment further includes: a third acquiring unit 705, where the third acquiring unit 705 is configured to perform, based on the filter coefficient information received by the third receiving unit 701, filtering on the reference signal received power RSRP, and obtain a path loss estimation value.

Optionally, the user equipment further includes: a third sending unit 706, where the third sending unit 706 is further configured to send an uplink physical channel or an uplink physical signal to the base station, where a transmit power of the uplink physical channel or the uplink physical signal is obtained by means of calculation according to the path loss estimation value.

The third sending unit 706 and the second sending unit 704 may be implemented by using a same physical module, and this time are described separately for ease of understanding.

Optionally, the signal quality measurement information includes: a reference signal received power RSRP, a reference signal strength indicator RSSI, or a reference signal received quality RSRQ.

Embodiment 7

Figure 9:
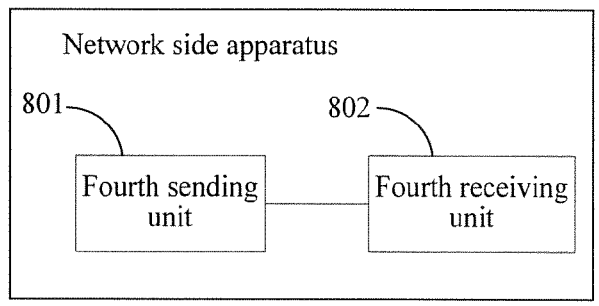
FIG. 9 is a brief schematic diagram of a network side apparatus according to Embodiment 7 of the present invention.

This embodiment of the present invention provides a network side apparatus. As shown in FIG. 9, the apparatus includes: a fourth sending unit 801 and a fourth receiving unit 802.

The fourth sending unit 801 is configured to send reference signal resource configuration information to user equipment, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal.

The fourth receiving unit 802 is configured to receive channel state information CSI sent by the user equipment, where the CSI is obtained by the user equipment according to the reference signal port configuration information and the power ratio information.

The network side apparatus described in Embodiment 7 above determines reference signal resource configuration information by using a network side, and sends the reference signal resource configuration information to a user side, where the reference signal resource configuration information includes reference signal port configuration information and power ratio information, where the reference signal port configuration information is used for indicating a mapping relationship between the reference signal port and a port group, and the power ratio information is used for indicating a power ratio of a data channel of at least one port group to a reference signal. The apparatus can avoid that reference signal power related information is indicated port by port, so as to reduce a signaling overhead; further, a uniform power indicator is used for ports in a port group, and for different port groups, power related information of the port groups may be indicated independently, so that full use of an antenna configuration or an antenna array structure is made, thereby enabling a system to flexibly select reference signal power related information according to the antenna configuration or the antenna array structure; because an antenna array may have symmetric weights, by means of the symmetry of the weights, design complexity in beamforming or side lobe suppression can be reduced.

Further, the reference signal resource configuration information is sent to UE on the user side, and the UE may perform processing according to reference signal quality, of one port group or multiple port groups, in the reference signal resource configuration information to obtain final signal quality measurement information, so that a UE side can distinguish ports according to different port groups, which differs from a case in which transmit powers of different ports cannot be distinguished in the prior art. The UE is enabled to acquire channel state information, so that the UE can perform more accurate modulation and coding scheme (MCS) selection or scheduling, thereby increasing a throughput of a system.

Optionally, in the power ratio information:

power ratios of data channels on antenna ports in each port group among the at least one port group to a reference signal are the same; or power ratios of data channels on ports in one port group among the at least one port group and data channels on ports in another port group to a reference signal are the same.

Optionally, the power ratio information is used for indicating multiple sets of power ratios of data channels of the at least one port group to a reference signal; and the fourth receiving unit 802 is specifically configured to receive multiple sets of channel state information CSI that are sent by the user equipment, where each set of channel state information CSI is obtained by the user equipment according to one set of power ratios among the multiple sets of power ratios.

Optionally, the channel state information CSI received by the fourth receiving unit 802 includes: any one or any combination of a channel quality indicator CQI, a precoding matrix indicator PMI, and a rank indicator RI.

The network side apparatus provided in this embodiment may be a base station on a network side, and reference may be made to the description of the corresponding steps in Embodiment 3 for implementation of functions of units of the network side apparatus, which is no longer repeated herein.

Embodiment 8

Figure 10:
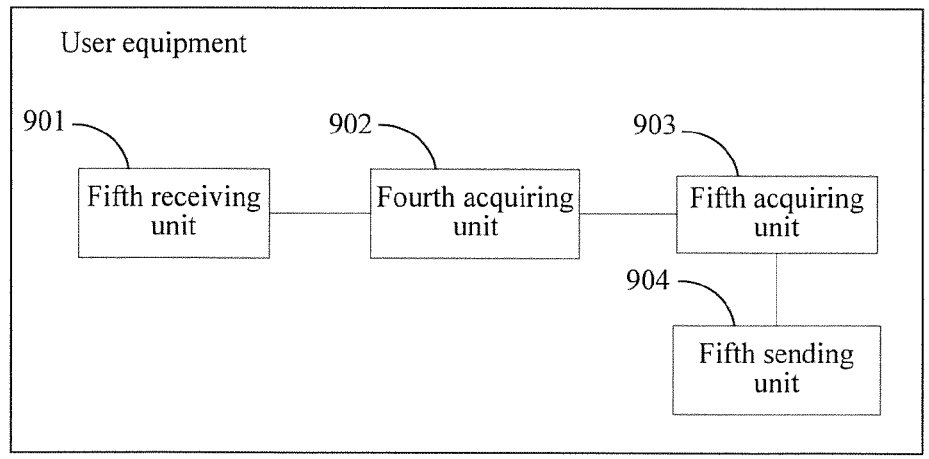
FIG. 10 is a brief schematic diagram of user equipment according to Embodiment 8 of the present invention.

This embodiment of the present invention provides user equipment. As shown in FIG. 10, the user equipment includes: a fifth receiving unit 901, a fourth acquiring unit 902, a fifth acquiring unit 903, and a fifth sending unit 904.

The fifth receiving unit 901 is configured to receive reference signal resource configuration information sent by a base station, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal.

The fourth acquiring unit 902 is configured to obtain a power ratio of a data channel on each antenna port in the at least one port group to a reference signal according to the reference signal port configuration information and the power ratio information that are received by the fifth receiving unit 901.

The fifth acquiring unit 903 is configured to obtain channel state information CSI according to the power ratio, of the data channel on each antenna port to the reference signal, obtained by the fourth acquiring unit 902.

The fifth sending unit 904 is configured to send, to the base station, the channel state information CSI obtained by the fifth acquiring unit 903.

This embodiment of the present invention provides user equipment. The apparatus may perform processing according to reference signal quality of one port group or multiple port groups to obtain final signal quality measurement information, so that a UE side can distinguish ports according to different port groups, which differs from a case in which transmit powers of different ports cannot be distinguished in the prior art. The UE is enabled to acquire channel state information, so that the UE can perform more accurate modulation and coding scheme (MCS) selection or scheduling, thereby increasing a throughput of a system.

Optionally, the fifth acquiring unit 903 is specifically configured to:

obtain, according to the reference signal on each antenna port, a channel measurement value corresponding to each antenna port;

obtain a channel estimation value of the data channel on each antenna port according to the channel measurement value corresponding to each antenna port and the power ratio of the data channel on each antenna port to the reference signal; and obtain the channel state information CSI according to the channel estimation value of the data channel on each antenna port.

Optionally, the obtaining, by the fifth acquiring unit 903, a channel estimation value of the data channel on each antenna port according to the channel measurement value corresponding to each antenna port and the power ratio of the data channel on each antenna port to the reference signal includes:

obtaining a channel estimation value of a data channel on an antenna port p according to a formula $\hat{h}_p = \sqrt{\rho_p} h_p$, where p is an index of the antenna port, $\rho_p$ is a power ratio of the data channel on the antenna port p to a reference signal, $h_p$ is a channel measurement value corresponding to the antenna port p, and $\hat{h}_p$ is a channel estimation value of the data channel on the antenna port p.

Optionally, in the power ratio information:

power ratios of data channels on antenna ports in each port group among the at least one port group to a reference signal are the same; or power ratios of data channels on ports in one port group among the at least one port group and data channels on ports in another port group to a reference signal are the same.

Optionally, the reference signal resource configuration information received by the fifth receiving unit 901 includes: the reference signal port configuration information and the power ratio information.

The power ratio information is used for indicating multiple sets of power ratios of data channels of the at least one port group to a reference signal; and the fifth sending unit 904 is specifically configured to:

send multiple sets of channel state information CSI to the base station, where each set of channel state information CSI is obtained according to one set of power ratios among the multiple sets of power ratios.

Optionally, the channel state information CSI obtained by the fifth acquiring unit 903 includes: any one or any combination of a channel quality indicator CQI, a precoding matrix indicator PMI, and a rank indicator RI.

For the user equipment provided in this embodiment, reference may be made to the description of the corresponding steps in Embodiment 4 for implementation of functions of units of the user equipment, which is no longer repeated herein.

Embodiment 9

Figure 11:
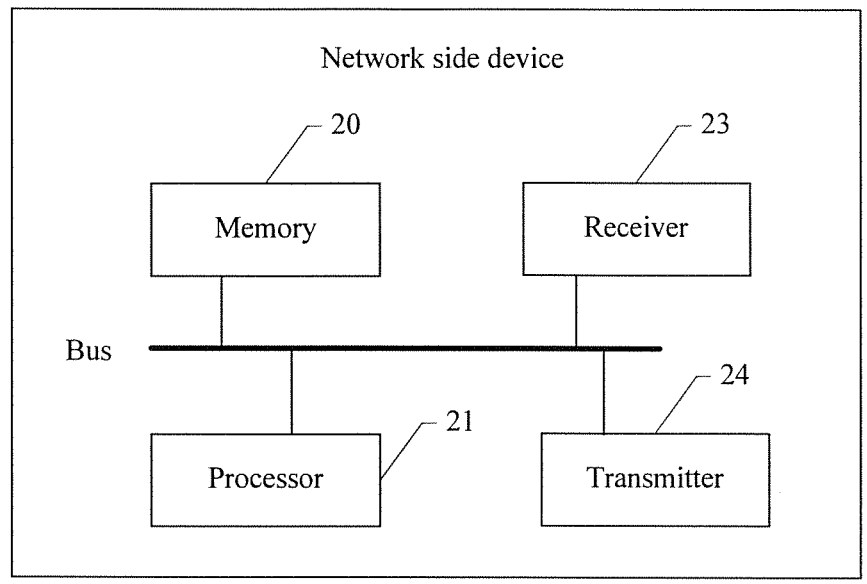
FIG. 11 is a brief schematic diagram of a network side apparatus according to Embodiment 9 of the present invention.

A network side apparatus is provided and can support a radio communications technology. Transmission of a data packet can be performed based on the method described in Embodiment 1 among units in a communications device in this embodiment. A schematic structural diagram is shown in FIG. 11, and the network side apparatus includes: a processor 21, a receiver 23, and a transmitter 24 that are separately connected to a bus.

Optionally, the shown network side apparatus may further include: a memory 20.

Where:

the memory 20 is configured to store data input from the receiver 23, and may further store information such as a necessary file for the processor 21 to process data; and the receiver 23 and the transmitter 24 are ports by using which a communications device communicates with another device.

The processor 21 is configured to determine reference signal resource configuration information, where the reference signal resource configuration information includes reference signal port configuration information, where the reference signal port configuration information is used for indicating a mapping relationship between a reference signal port and a port group.

The transmitter 24 is configured to send the reference signal resource configuration information to user equipment, so that the user equipment acquires signal quality measurement information according to the reference signal port configuration information.

Optionally, the reference signal resource configuration information determined by the processor 21 further includes: reference signal power information of at least two port groups that is used by the user equipment to acquire the signal quality measurement information according to the reference signal port configuration information and in combination with the reference signal power information of the at least two port groups.

The reference signal power information of the at least two port groups includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

Optionally, when the signal quality measurement information is a reference signal received power RSRP, the transmitter 24 is further configured to send, to the user equipment, filter coefficient information that is used by the user equipment to perform, based on the filter coefficient information, filtering on the reference signal received power RSRP and obtain a path loss estimation value.

Optionally, the receiver 23 is configured to receive an uplink physical channel or an uplink physical signal sent by the user equipment, where a transmit power of the uplink physical channel or the uplink physical signal is obtained by means of calculation by the user equipment according to the path loss estimation value.

Optionally, the signal quality measurement information includes:

any one or any combination of a reference signal received power RSRP, a reference signal received quality RSRQ, and a reference signal strength indicator RSSI.

Optionally, the receiver 23 is further configured to receive the signal quality measurement information sent by the user equipment.

The network side apparatus described in this embodiment may be a base station on a network side, and reference may be made to the description of the corresponding steps in Embodiment 1 for implementation of functions of units of the network side apparatus, which is no longer repeated herein.

Embodiment 10

Figure 12:
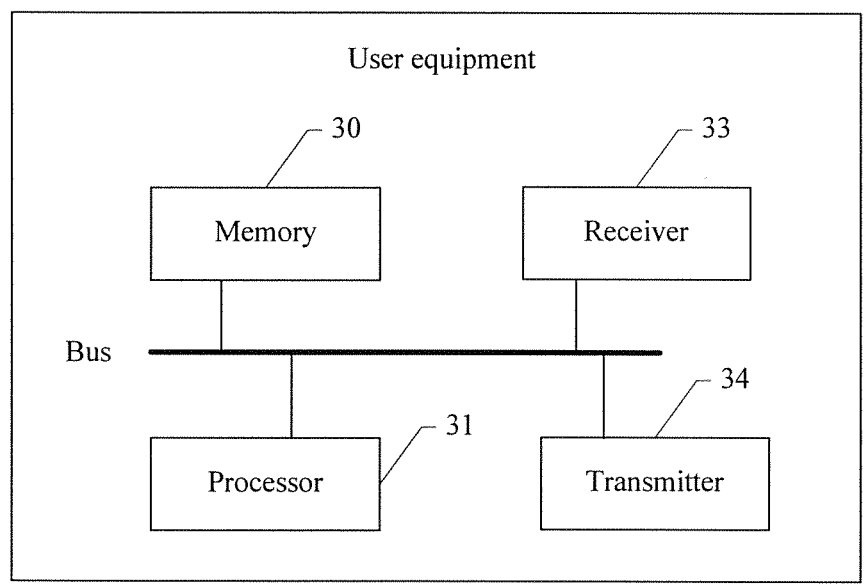
FIG. 12 is a brief schematic diagram of user equipment according to Embodiment 10 of the present invention.

This embodiment provides user equipment, which can support a radio communications technology. Transmission of a data packet can be performed based on the method described in Embodiment 2 among units in a communications device in this embodiment. A schematic structural diagram is shown in FIG. 12, and the user equipment includes: a processor 31, a receiver 33, and a transmitter 34 that are separately connected to a bus.

Optionally, the shown network side apparatus may further include: a memory 30.

The memory 30 is configured to store data input from the receiver 33, and may further store information such as a necessary file for the processor 31 to process data; and the receiver 33 and the transmitter 34 are ports by using which a communications device communicates with another device.

The receiver 33 is configured to receive reference signal resource configuration information sent by a base station, where the reference signal resource configuration information includes reference signal port configuration information, where the reference signal port configuration information is used for indicating a mapping relationship between a reference signal port and a port group.

The processor 31 is configured to obtain reference signal port information in at least one port group according to the reference signal port configuration information; and acquire signal quality measurement information according to the reference signal port information in the at least one port group.

Optionally, the processor 31 is specifically configured to:

obtain reference signal port information in one specified port group according to the reference signal port configuration information; and acquire the signal quality measurement information according to the reference signal port information in the one specified port group.

Optionally, when the signal quality measurement information is a reference signal received power RSRP, the acquiring, by the processor 31, the signal quality measurement information according to the reference signal port information in the one specified port group includes:

obtaining a reference signal received power RSRP(r,p) of a pth port of an rth receive antenna according to a formula $$RSRP(r, p) = \frac{1}{K_s - 1} \sum_{m=0}^{K_s - 1} \hat{h}_p(m) \cdot \hat{h}_p(m+1)$$

and obtaining the RSRP by combining RSRP(r,p), where $\hat{h}_p(m)$ is a channel estimation on a reference signal RE whose label number is m, $K_s$ is a total sample quantity of usable reference signal REs in measurement bandwidth, p is a number of a reference signal port in the one specified port group, and r is an index of a receive antenna.

Optionally, the reference signal resource configuration information received by the receiver 33 further includes: reference signal power information of at least two port groups that is used by the user equipment to acquire the signal quality measurement information according to the reference signal port configuration information and in combination with the reference signal power information of the at least two port groups.

Optionally, the acquiring, by the processor 31, the signal quality measurement information according to the reference signal port configuration information and in combination with the reference signal power information of the at least two port groups includes:

obtaining, according to the reference signal port configuration information, signal quality measurement information corresponding to the at least two port groups; and performing, according to the reference signal power information of the at least two port groups, weighted averaging on the obtained signal quality measurement information corresponding to the at least two port groups in accordance with a port group power, to obtain the signal quality measurement information.

Optionally, the performing, by the processor 31, according to the reference signal power information of the at least two port groups, weighted averaging on the obtained signal quality measurement information corresponding to the at least two port groups in accordance with a port group power, to obtain the signal quality measurement information includes:

obtaining the signal quality measurement information according to a formula $$SQ = \left(\sum_{g=0}^{n-1} p_g \cdot SQ_g\right) \bigg/ \left(\sum_{g=0}^{n-1} p_g\right),$$

where $SQ_g$ is signal quality measurement information of a specified port group, g is a sequence number of a specified port group, n is a quantity of specified port groups, n≥2, and $p_g$ is a reference signal power of a specified port group, where the reference signal power of the specified port group is obtained according to the reference signal power information of the at least two port groups.

Optionally, the reference signal power information, of the at least two port groups, received by the receiver 33 includes:

a reference signal power of a first port group, and a ratio of a reference signal power of each port group among the rest port groups to the reference signal power of the first port group; or a reference signal power of a first port group, and a differential between a reference signal power of each port group among the rest port groups and the reference signal power of the first port group.

Optionally, the transmitter 34 is configured to send the signal quality measurement information to the base station.

Optionally, when the signal quality measurement information is a reference signal received power RSRP, the receiver 33 is further configured to receive filter coefficient information sent by the base station; and the processor 31 is further configured to perform, based on the filter coefficient information, filtering on the reference signal received power RSRP, and obtain a path loss estimation value.

Optionally, the transmitter 34 is further configured to send an uplink physical channel or an uplink physical signal to the base station, where a transmit power of the uplink physical channel or the uplink physical signal is obtained by means of calculation according to the path loss estimation value.

Optionally, the signal quality measurement information includes: a reference signal received power RSRP, a reference signal strength indicator RSSI, or a reference signal received quality RSRQ.

Embodiment 11

Figure 13:
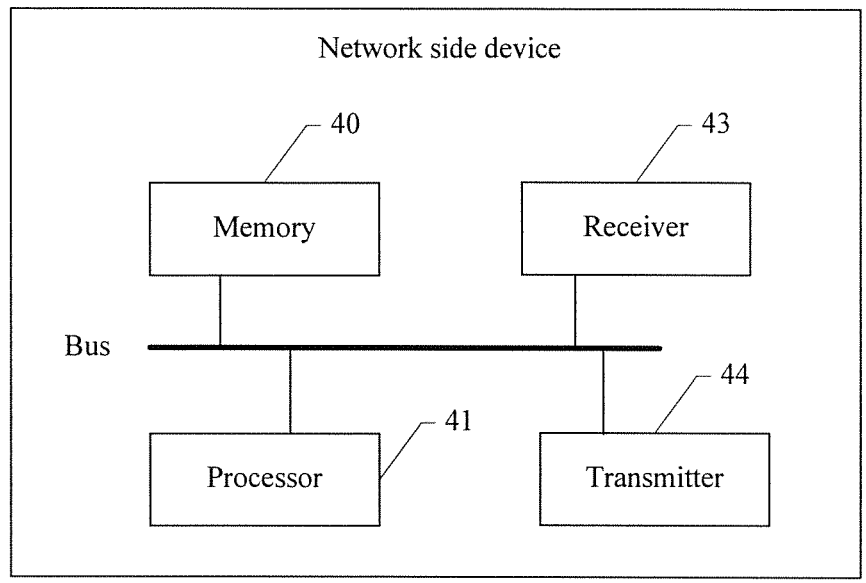
FIG. 13 is a brief schematic diagram of a network side apparatus according to Embodiment 11 of the present invention.

A network side apparatus is provided and can support a radio communications technology. Transmission of a data packet can be performed based on the method described in Embodiment 3 among units in a communications device in this embodiment. A schematic structural diagram is shown in FIG. 13, and the network side apparatus includes: a processor 41, a receiver 43, and a transmitter 44 that are separately connected to a bus.

Optionally, the shown network side apparatus may further include: a memory 40.

The memory 40 is configured to store data input from the receiver 43, and may further store information such as a necessary file for the processor 41 to process data; and the receiver 43 and the transmitter 44 are ports by using which a communications device communicates with another device.

The transmitter 44 is configured to send reference signal resource configuration information to user equipment, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal; and the receiver 43 is configured to receive channel state information CSI sent by the user equipment, where the CSI is obtained by the user equipment according to the reference signal port configuration information and the power ratio information.

Optionally, in the power ratio information:

power ratios of data channels on antenna ports in each port group among the at least one port group to a reference signal are the same; or power ratios of data channels on ports in one port group among the at least one port group and data channels on ports in another port group to a reference signal are the same.

Optionally, the power ratio information is used for indicating multiple sets of power ratios of data channels of the at least one port group to a reference signal; and the receiving, by the receiver 33, channel state information CSI sent by the user equipment includes: receiving multiple sets of channel state information CSI that are sent by the user equipment, where each set of channel state information CSI is obtained by the user equipment according to one set of power ratios among the multiple sets of power ratios.

Optionally, the channel state information CSI received by the receiver 33 includes: any one or any combination of a channel quality indicator CQI, a precoding matrix indicator PMI, and a rank indicator RI.

The network side apparatus provided in this embodiment may be a base station on a network side, and reference may be made to the description of the corresponding steps in Embodiment 3 for implementation of functions of units of the network side apparatus, which is no longer repeated herein.

Embodiment 12

Figure 14:
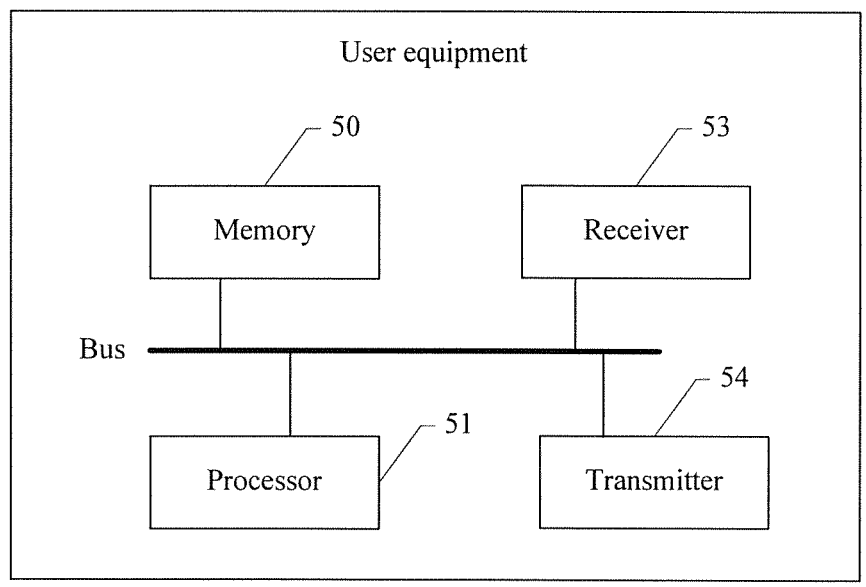
FIG. 14 is a brief schematic diagram of user equipment according to Embodiment 12 of the present invention.

This embodiment provides user equipment, which can support a radio communications technology. Transmission of a data packet can be performed based on the method described in Embodiment 4 among units in a communications device in this embodiment. A schematic structural diagram is shown in FIG. 14, and the user equipment includes: a processor 51, a receiver 53, and a transmitter 54 that are separately connected to a bus.

Optionally, the shown network side apparatus may further include: a memory 50.

The memory 50 is configured to store data input from the receiver 53, and may further store information such as a necessary file for the processor 51 to process data; and the receiver 53 and the transmitter 54 are ports by using which a communications device communicates with another device.

The receiver 53 is configured to receive reference signal resource configuration information sent by a base station, where the reference signal resource configuration information includes: reference signal port configuration information and power ratio information, where the reference signal port configuration information is used for indicating a mapping relationship between the reference signal port and a port group, and the power ratio information is used for indicating a power ratio of a data channel of at least one port group to a reference signal.

The processor 51 is configured to obtain a power ratio of a data channel on each antenna port in the at least one port group to a reference signal according to the reference signal port configuration information and the power ratio information, and obtain channel state information CSI according to the power ratio of the data channel on each antenna port to the reference signal.

The transmitter 54 is configured to send the channel state information CSI to the base station.

Optionally, the obtaining, by the processor 51, channel state information CSI according to the power ratio of the data channel on each antenna port to the reference signal includes:

obtaining, according to the reference signal on each antenna port, a channel measurement value corresponding to each antenna port;

obtaining a channel estimation value of the data channel on each antenna port according to the channel measurement value corresponding to each antenna port and the power ratio of the data channel on each antenna port to the reference signal; and obtaining the channel state information CSI according to the channel estimation value of the data channel on each antenna port.

Optionally, the obtaining, by the processor 51, a channel estimation value of the data channel on each antenna port according to the channel measurement value corresponding to each antenna port and the power ratio of the data channel on each antenna port to the reference signal includes:

obtaining a channel estimation value of a data channel on an antenna port p according to a formula $\hat{h}_p = \sqrt{\rho_p} h_p$, where p is an index of the antenna port, $\rho_p$ is a power ratio of the data channel on the antenna port p to a reference signal, $h_p$ is a channel measurement value corresponding to the antenna port p, and $\hat{h}_p$ is a channel estimation value of the data channel on the antenna port p.

Optionally, in the power ratio information:

power ratios of data channels on antenna ports in each port group among the at least one port group to a reference signal are the same; or power ratios of data channels on ports in one port group among the at least one port group and data channels on ports in another port group to a reference signal are the same.

Optionally, the power ratio information is used for indicating multiple sets of power ratios of data channels of the at least one port group to a reference signal; and the transmitter 54 is specifically configured to:

send multiple sets of channel state information CSI to the base station, where each set of channel state information CSI is obtained according to one set of power ratios among the multiple sets of power ratios.

Optionally, the channel state information CSI obtained by the processor 51 includes: any one or any combination of a channel quality indicator CQI, a precoding matrix indicator PMI, and a rank indicator RI.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The method and the apparatus for measuring communication quality provided in the embodiments of the present invention are introduced above in detail. In this specification, specific examples are used to describe the principle and implementation manners of the present invention, and the description of the embodiments is only intended to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A method for measuring communication quality, the method comprising:

receiving reference signal resource configuration information sent by a base station, wherein the reference signal resource configuration information comprises reference signal port configuration information, wherein the reference signal port configuration information is used for indicating a mapping relationship between a reference signal port and a port group;

obtaining reference signal port information in at least one specified port group according to the reference signal port configuration information; and acquiring signal quality measurement information according to the reference signal port information in the at least one specified port group, wherein when the signal quality measurement information is a reference signal received power (RSRP), acquiring the signal quality measurement information according to the reference signal port information in the one specified port group comprises obtaining a reference signal received power $RSRP_r(p)$ of a pth port of an rth receive antenna according to a formula:

$$RSRPr(p) = \frac{1}{K_s - 1} \sum_{m=0}^{K_s-1} \hat{h}_p(m) \cdot \hat{h}_p(m+1)$$

and obtaining the RSRP by combining $RSRP_r(p)$, wherein $\hat{h}_p(m)$ is a channel estimation on a reference signal RE whose label number is m, $K_s$ is a total sample quantity of usable reference signal REs in measurement bandwidth, p is a number of a reference signal port in the one specified port group, and r is an index of a receive antenna.

2. The method according to claim 1, further comprising: sending the signal quality measurement information to the base station.

3. A method for measuring communication quality, the method comprising:
- receiving reference signal resource configuration information sent by a base station, wherein the reference signal resource configuration information comprises: reference signal port configuration information and power ratio information, wherein the reference signal port configuration information is used for indicating a mapping relationship between a reference signal port and a port group, and the power ratio information is used for indicating a power ratio of a data channel of at least one port group to a reference signal;
- obtaining the power ratio of the data channel on each antenna port in the at least one port group to a reference signal according to the reference signal port configuration information and the power ratio information;
- obtaining channel state information (CSI) according to the power ratio of the data channel on each antenna port to the reference signal, comprising:
  - obtaining, according to the reference signal on each antenna port, a channel measurement value corresponding to each antenna port;
  - obtaining a channel estimation value of the data channel on each antenna port according to the channel measurement value corresponding to each antenna port and the power ratio of the data channel on each antenna port to the reference signal, including
    - obtaining the channel estimation value of the data channel on an antenna port p according to a formula $\hat{h}_p = \sqrt{\rho_p h_p}$, wherein
    - p is an index of the antenna port, $\rho_p$ is the power ratio of the data channel on the antenna port p to the reference signal, $h_p$ is a channel measurement value corresponding to the antenna port p, and $\hat{h}_p$ is the channel estimation value of the data channel on the antenna port p; and
  - obtaining the CSI according to the channel estimation value of the data channel on each antenna port; and
- sending the CSI to the base station.

4. The method according to claim 3, wherein:
- power ratios of data channels on antenna ports in each port group among the at least one port group to the reference signal are the same; or
- power ratios of data channels on ports in one port group among the at least one port group and data channels on ports in another port group to the reference signal are the same.

5. The method according to claim 3, wherein:
- the power ratio information is used for indicating multiple sets of power ratios of data channels of the at least one port group to the reference signal; and
- sending the CSI to the base station comprises:
  - sending multiple sets of CSI to the base station, wherein each set of CSI is obtained according to one set of power ratios among the multiple sets of power ratios.

6. The method according to claim 3, wherein the CSI comprises: any one or any combination of a channel quality indicator (CQI), a precoding matrix indicator (PMI), and a rank indicator (RI).

7. A method for measuring communication quality, the method comprising:
- receiving reference signal resource configuration information sent by a base station, wherein the reference signal resource configuration information comprises:
  - reference signal port configuration information, wherein the reference signal port configuration information is used for indicating a mapping relationship between a reference signal port and a port group; and
  - reference signal power information of at least two port groups that is used by a user equipment to acquire signal quality measurement information according to the reference signal port configuration information;
- obtaining reference signal port information in the least two port groups according to the reference signal port configuration information; and
- acquiring the signal quality measurement information for the at least two port groups according to the reference signal port information in the at least two port groups and in combination with the reference signal power information of the at least two port groups, including:
  - performing, according to the reference signal power information of the at least two port groups, weighted averaging on the acquired signal quality measurement information corresponding to the at least two port groups in accordance with a port group power to acquire the signal quality measurement information in accordance with the formula:

$$SQ = \left(\sum_{g=0}^{n-1} p_g \cdot SQ_g\right) \bigg/ \left(\sum_{g=0}^{n-1} p_g\right),$$

wherein
- $SQ_g$ is signal quality measurement information of a specified port group, g is a sequence number of the specified port group, n is a quantity of specified port groups, n≥2, and $P_g$ is a reference signal power of the specified port group, wherein the reference signal power of the specified port group is obtained according to the reference signal power information of the at least two port groups.

8. The method according to claim 7, wherein the reference signal power information of the at least two port groups comprises:
- a reference signal power of a first port group, and a ratio of a reference signal power of each port group among the rest port groups to the reference signal power of the first port group; or
- a reference signal power of a first port group, and a differential between a reference signal power of each port group among the rest port groups and the reference signal power of the first port group.

* * * * *